United States Patent
Withers et al.

(10) Patent No.: US 7,352,903 B2
(45) Date of Patent: Apr. 1, 2008

(54) METHODS AND APPARATUS FOR IMPLEMENTING JPEG 2000 ENCODING OPERATIONS

(75) Inventors: William Douglas Withers, Crofton, MD (US); John H. Elton, Atlanta, GA (US); James R. Bean, Ballston Spa, NY (US)

(73) Assignee: Pegasus Imaging Corporation, Tampa, FL (US)

(*) Notice: Subject to any disclaimer, the term of this patent is extended or adjusted under 35 U.S.C. 154(b) by 615 days.

(21) Appl. No.: 10/988,434

(22) Filed: Nov. 12, 2004

(65) Prior Publication Data

US 2006/0039614 A1    Feb. 23, 2006

Related U.S. Application Data

(60) Provisional application No. 60/602,157, filed on Aug. 17, 2004.

(51) Int. Cl.
    *G06K 9/36* (2006.01)
(52) U.S. Cl. ...................... 382/232; 382/240
(58) Field of Classification Search ................. 382/232, 382/233, 234, 240, 244
    See application file for complete search history.

(56) References Cited

U.S. PATENT DOCUMENTS 6,266,450 B1 * 7/2001 Yip et al. ................... 382/240
7,006,697 B1 * 2/2006 Gormish et al. ............ 382/234

* cited by examiner

*Primary Examiner*—Duy M. Dang
(74) *Attorney, Agent, or Firm*—Straub & Pokotylo; Michael P. Straub; Ronald P. Straub

(57) ABSTRACT

Improved methods and apparatus for implementing JPEG 2000 MQ encoding operations are described. The following features of the invention may be used alone or in combination to implement JPEG 2000's coefficient bit modeling 1) Lists of coefficients to be processed in one or more subsequent coding passes are generated as coefficients are processed. The list is allows processing in the subsequent coding pass to be limited to coefficients on the list; and 2) Generation, updating and use of a neighborhood descriptor value table that stores a neighborhood descriptor value for each coefficient of a block being processed. The neighborhood descriptor values provide information about the state of the coefficient and its adjacent neighbors. Neighborhood descriptor values are used to access a lookup table that provides one or more context values and/or sign value to be used in MQ encoding. The neighborhood descriptor value corresponding to a coefficient and the neighborhood descriptor values corresponding to coefficients adjacent the coefficient are updated when the coefficient becomes significant, e.g., a 1 is first encountered in the coefficient.

21 Claims, 26 Drawing Sheets

Legend
——▶ Transition when horizontal (LL or LH) or vertical (HL) neighbor blossoms
------▶ Transition when vertical (LL or LH) or horizontal (HL) neighbor blossoms
—·—·▶ Transition when diagonal neighbor blossoms

| Index | +HND | -HND | +VND | -VND | DND | CXD1 | CXD2 | DSD |
|---|---|---|---|---|---|---|---|---|
| D0 | D8 | D9 | D3 | D4 | D1 | 0 | 9 | + |
| D1 | D10 | D11 | D3 | D4 | D2 | 1 | 9 | + |
| D2 | D10 | D11 | D3 | D4 | D2 | 2 | 9 | + |
| D3 | D16 | D13 | D6 | D5 | D3 | 3 | 10 | + |
| D4 | D12 | D17 | D5 | D7 | D4 | 3 | 10 | - |
| D5 | D14 | D15 | D6 | D7 | D5 | 4 | 9 | + |
| D6 | D16 | D13 | D6 | D5 | D6 | 4 | 10 | + |
| D7 | D12 | D17 | D5 | D7 | D7 | 4 | 10 | - |
| D8 | D23 | D18 | D16 | D12 | D10 | 5 | 12 | + |
| D9 | D18 | D24 | D13 | D17 | D11 | 5 | 12 | - |
| D10 | D23 | D18 | D16 | D12 | D10 | 6 | 12 | + |
| D11 | D18 | D24 | D13 | D17 | D11 | 6 | 12 | - |
| D12 | D21 | D20 | D14 | D12 | D12 | 7 | 11 | + |
| D13 | D19 | D22 | D13 | D15 | D13 | 7 | 11 | - |
| D14 | D23 | D18 | D16 | D12 | D14 | 7 | 12 | + |
| D15 | D18 | D24 | D13 | D17 | D15 | 7 | 12 | - |
| D16 | D25 | D19 | D16 | D14 | D16 | 7 | 13 | + |
| D17 | D20 | D26 | D15 | D17 | D17 | 7 | 13 | - |
| D18 | D23 | D24 | D19 | D20 | D18 | 8 | 9 | + |
| D19 | D25 | D22 | D19 | D18 | D19 | 8 | 10 | + |
| D20 | D21 | D26 | D18 | D20 | D20 | 8 | 10 | - |
| D21 | D21 | D20 | D23 | D21 | D21 | 8 | 11 | + |
| D22 | D19 | D22 | D22 | D24 | D22 | 8 | 11 | - |
| D23 | D23 | D18 | D25 | D21 | D23 | 8 | 12 | + |
| D24 | D18 | D24 | D22 | D26 | D24 | 8 | 12 | - |
| D25 | D25 | D19 | D25 | D23 | D25 | 8 | 13 | + |
| D26 | D20 | D26 | D24 | D26 | D26 | 8 | 13 | - |
| D48 | D49 | D49 | D49 | D49 | D49 | 14 | | |
| D49 | D49 | D49 | D49 | D49 | D49 | 15 | | |
| D50 | D50 | D50 | D50 | D50 | D50 | 16 | | |

FIGURE 21

| | 2302 | 2304 | 2306 | 2308 | 2310 | 2312 | 2314 | 2316 | 2318 |
|---|---|---|---|---|---|---|---|---|---|
| | Index | +HNF | -HNF | +VNF | -VNF | DNF | CXF1 | CXF2 | DSF |
| 23025 → | F25 | F19 | F25 | F23 | F27 | F35 | 5 | 13 | - |
| 23026 → | F26 | F26 | F20 | F26 | F24 | F36 | 5 | 14 | + |
| 23027 → | F27 | F21 | F27 | F25 | F27 | F37 | 5 | 14 | - |
| 23028 → | F28 | F34 | F35 | F30 | F31 | F38 | 6 | 10 | + |
| 23029 → | F29 | F34 | F35 | F30 | F31 | F38 | 7 | 10 | + |
| 23030 → | F30 | F36 | F33 | F30 | F29 | F39 | 7 | 11 | + |
| 23031 → | F31 | F32 | F37 | F29 | F31 | F40 | 7 | 11 | − |
| 23032 → | F32 | F32 | F31 | F34 | F32 | F41 | 7 | 12 | + |
| 23033 → | F33 | F30 | F33 | F33 | F35 | F42 | 7 | 12 | - |
| 23034 → | F34 | F34 | F29 | F36 | F32 | F43 | 7 | 13 | + |
| 23035 → | F35 | F29 | F35 | F33 | F37 | F44 | 7 | 13 | - |
| 23036 → | F36 | F36 | F30 | F36 | F34 | F45 | 7 | 14 | + |
| 23037 → | F37 | F31 | F37 | F35 | F37 | F46 | 7 | 14 | - |
| 23038 → | F38 | F43 | F44 | F39 | F40 | F38 | 8 | 10 | + |
| 23039 → | F39 | F45 | F42 | F39 | F38 | F39 | 8 | 11 | + |
| 23040 → | F40 | F41 | F46 | F38 | F40 | F40 | 8 | 11 | - |
| 23041 → | F41 | F41 | F40 | F43 | F41 | F41 | 8 | 12 | + |
| 23042 → | F42 | F39 | F42 | F42 | F44 | F42 | 8 | 12 | - |
| 23043 → | F43 | F43 | F38 | F45 | F41 | F43 | 8 | 13 | + |
| 23044 → | F44 | F38 | F44 | F42 | F46 | F44 | 8 | 13 | - |
| 23045 → | F45 | F45 | F39 | F45 | F43 | F45 | 8 | 14 | + |
| 23046 → | F46 | F40 | F46 | F44 | F46 | F46 | 8 | 14 | - |
| 23048 → | F48 | F49 | F49 | F49 | F49 | F49 | 14 | | |
| 23049 → | F49 | F49 | F49 | F49 | F49 | F49 | 15 | | |
| 23050 → | F50 | F50 | F50 | F50 | F50 | F50 | 16 | | |

| Fig. 23A |
|---|
| Fig. 23B |

METHODS AND APPARATUS FOR IMPLEMENTING JPEG 2000 ENCODING OPERATIONS

RELATED APPLICATION

The present application claims the benefit of the filing date of U.S. Provisional Patent Application Ser. No. 60/602,157, which was filed on Aug. 17, 2004.

FIELD OF THE INVENTION

The present invention relates to image encoding and, more particularly, to methods and apparatus for implementing JPEG 2000 encoding operations.

BACKGROUND

JPEG 2000 relates to an image coding. The image format is described in ISO document 15444-1. The JPEG 2000 format is designed to compactly represent an image while allowing convenient manipulation and selective access.

A significant drawback of the JPEG 2000 format is its computational complexity, which far exceeds that of earlier formats such as original JPEG. This computational complexity results in a large increase in the time required to translate an image to or from JPEG 2000 format by software running on a general-purpose computer. Major steps typically comprising the translation of an un-encoded image to JPEG 2000 format are the following:

1) A color-component transform;
2) A wavelet transform;
3) Quantization;
4) Coefficient bit modeling;
5) Entropy coding.

Translation of an image from JPEG 2000 format to an un-encoded format normally comprises the same steps in reverse order. Of these, Step (4) (Coefficient bit modeling) is by far the most complex of the mentioned operations and is the subject of this invention.

JPEG 2000's coefficient bit modeling is described in Annex D of ISO 15444-1. Its description requires some limited familiarity with the preceding and succeeding steps.

In translating an image to JPEG 2000 format, e.g., during JPEG 2000 encoding the steps (color-component transform, wavelet transform, and quantization) preceding the coefficient bit modeling step generate a set of coefficient indices—often numbering a million or more—describing the image. These indices are partitioned into units called code-blocks. Each code-block comprises a rectangular array of coefficient indices. The coefficient indices of a single code-block all belong to a single contiguous subrectangle of the image, all belong to a single color component generated by the color-component transform, and all belong to a single frequency sub-band generated by the wavelet transform. This sub-band (and hence the corresponding code-block) corresponds to one of four specific types "flavors" (LL, LH, HL, or HH) according to the formulae with which it is generated by the wavelet transform. LL corresponds to a Low-pass horizontal, Low-pass vertical sub-band. LH corresponds to a Low-pass horizontal, High-pass vertical sub-band. HL corresponds to a High-pass horizontal, Low-pass vertical sub-band. HH corresponds to a High-pass horizontal, High-pass vertical sub-band.

In JPEG 2000 each coefficient index is most usefully considered in sign-magnitude (base-2) representation. The magnitude is represented by a sequence of binary symbols (bits) ranging from the most significant (leftmost) to the least significant (rightmost). The more zero-valued leftmost bits in the representation, the smaller the magnitude value; if all bits are zero-valued, the coefficient index has the value zero. An additional bit indicates whether the coefficient index is positive or negative—value 0 for a positive coefficient index and value 1 for a negative. This sign bit is ignored if the magnitude is zero.

Entropy-coding which follows the coefficient bit modeling step in JPEG 2000 encoding encodes the bit values of the coefficient indices using a specific coding algorithm called the MQ-coder. The MQ-coder is one of a family of algorithms which attempt to predict each bit-value based on the previous history of coded bit-values. When the prediction is correct, the bit-value is coded more compactly—the more confident the original prediction, the more compact the resulting coding. Conversely, when the prediction is incorrect, the bit-value must be coded using more than one bit—and the more confident the original prediction, the greater the penalty for an incorrect guess. However, the trade-off is such that the more confident the prediction, the more compact the overall coding is, even taking into account the penalty for mistaken predictions.

Let P be a value between 0.5 and 1 indicating the confidence of a given bit-value prediction. Values of P less than 0.5 do not occur because such would indicate that the opposite bit-value is more likely to occur. A value of P equaling 1 indicates perfect confidence—a predicted value that is guaranteed to be correct. The number of bits required to code the bit-value in the event the prediction is correct is given by (lg P) (base 0.5 logarithm of P). The number of bits required to code the bit-value in the event the prediction is incorrect is given by (lg(1−P)). Taking probabilities of both correct and incorrect prediction into account, the overall expected number of bits required to code the bit-value is H=(P lg P+(1−P)lg(1−P)). Table 1 shown below shows the bits required to code correct and incorrect predictions, and the overall expected number of bits required, for various sample values of P.

TABLE 1

| P | lg P | lg(1 − P) | H |
|---|---|---|---|
| 0.5 | 1.0000 | 1.0000 | 1.0000 |
| 0.6 | 0.8656 | 1.3219 | 0.9710 |
| 0.7 | 0.5146 | 1.7370 | 0.8813 |
| 0.8 | 0.3219 | 2.3219 | 0.7219 |
| 0.9 | 0.1520 | 3.3219 | 0.4690 |
| 1.0 | 0.0000 | infinity | 0.0000 |

The compactness of the coding is greatly enhanced by grouping the bit-values to be coded into categories. The bit-values in each category are expected to have similar confidence values of predictability. This grouping should be done on the basis of preceding bit-values in the code-stream, so that it can be performed in the same manner whether translating to or from JPEG 2000 format. The information from the preceding code-stream bit-values used to categorize a given bit-value is called the context for that bit-value.

In order that a MQ-coder able to encode (or decode) coefficient index bit-values generated by Steps (1)-(3), those bit-values must be ordered in a certain sequence and each bit-value must be categorized. This is the "coefficient bit modeling" task identified as Step (4).

An overview of coefficient bit modeling will now be presented. Each code-block can be considered as an independent unit. This is the JPEG 2000's standard approach.

When translating (encoding) to JPEG 2000 format, each code-block is modeled and coded independently, and the various code-streams are then interleaved, e.g. using known methods. When translating from JPEG 2000 format, the code-streams for the various code-blocks are first de-interleaved and each code-block is then independently decoded.

Within a single code-block, the bit-values are organized into bit-planes according to position. The leftmost bit-plane includes the leftmost bit-values for all coefficient indices, the next bit-plane includes the next bit-values for all coefficient indices, and so on, the rightmost bit-plane includes the rightmost bit-values for all coefficient indices. The sign-bits for all coefficient indices do not form a bit-plane but are coded at various locations in the code-stream depending on the various coefficient index values. As a general principle all bit-values for a given bit-plane are coded before any bit-values of the next bit-plane to the right. However, bit-values within a single bit-plane are ordered in an intricate and not easily predictable sequence, according to JPEG 2000 encoding principles which will be described below.

Some bit-values (those considered to have the least impact on image quality) may actually be left uncoded. If any bit-values of a given bit-plane are left uncoded, then all bit-values of any bit-planes further right are uncoded. The JPEG 2000 coding process will now be described under the assumption that all bit-values are coded Recall that the coefficient indices for a given code-block form a rectangular array. Thus surrounding a typical coefficient index are eight immediate neighbors (nine if the coefficient index itself is counted), those coefficient indices immediately adjacent both horizontally and vertically. The exceptions are coefficient indices at the boundary of the code-block, which may have only five or three immediate neighbors. The location of a bit-value in the code-stream for its bit-plane and the context used by the MQ-coder for coding the bit-value are derived from the values of these neighbors. "Missing" neighbors of coefficient indices at the boundary or corners of the code-block are treated as if zero-valued for the purpose of coefficient bit modeling.

Of particular importance is the significance state of the neighboring coefficient indices: a value 0 or 1 indicating whether the coefficient index is known to be non-zero based on previously coded information. In the course of coding a given bit-plane, any coefficient index having a non-zero bit-value in any previously coded bit-plane has a significance state of 1; any coefficient index having zero bit-values in all bit-planes up to and including the current bit-plane has a significance state of 0. A coefficient index having zero bit-values in all preceding bit-planes and a non-zero bit-value in the current bit-plane may have a significance state of 0 or 1, depending on whether that coefficient's bit-value for the current bit-plane has already been coded (1) or not (0).

Coefficient indices with a significance state of 1 are called significant; those with a significance state of 0 are called insignificant. The status of a coefficient index as significant or insignificant may change as coding progresses. All coefficient indices in JPEG 2000 are insignificant at the start of coding; some switch from insignificant to significant in the course of coding, but no coefficient ever switches from significant to insignificant.

Each bit-plane of the code-block is coded in three coding passes. Each coding pass follows a known scanning pattern. The code-block's coefficient indices are partitioned horizontally into stripes, each stripe includes four rows (except that the bottommost stripe comprises one to four rows depending on the code-block height). Each stripe is partitioned vertically into columns each containing four coefficient indices except that each column of the bottommost stripe contains as many coefficient indices as the number of rows in the stripe. In each coding pass, bit-values of each stripe are coded before the stripes below; within each stripe, bit-values of each column are coded before columns to the right; and within each column, bit-values are coded from top to bottom. In any coding pass some or all bit-values may be skipped, but those values not skipped are coded in the sequence given by this scanning pattern. Each bit-value of each bit-plane is coded in exactly one of the three coding passes (and therefore skipped in the other two coding passes) for that bit-plane.

The JPEG 2000 significance-propagation pass is the first of three different types of coding passes for a given bit-plane which are performed as part of the JPEG 2000 coefficient bit modeling step. In the significance-propagation pass, bit-values are coded for those coefficient indices which:

1) are not significant before the current coding pass; and
2) have at least one significant neighbor at the time the given bit-value is coded.

Note that due to condition (2), the particular specified scanning pattern influences the inclusion of bit-values in the significance-propagation pass. The choice of MQ-coder context for each bit-value is determined by the significance state of the given coefficient index's eight neighbors. In the present application we let Csp denote the configuration of the eight neighbors' significance states. Since each significance state has two possible values, the possible number of such configurations is $2^8=256$.

The JPEG 2000 Specification stipulates that the MQ-coder context value, Msp, used to code the current bit-value, taking one of nine possible values arbitrarily labeled S0-S8, be derived from the configuration value by an ad hoc correspondence Asp: Msp =Asp(Csp). (In a special case, the context value S0, indicates that all eight neighbors are insignificant and that the given bit-value is not coded in the significance-propagation pass.) If performed by logical operations, as done in some systems, determining Asp represents a considerable computational burden. The details of the ad hoc correspondence depends on whether the code-block being coded is of type LL, LH, HL, or HH. The rules for each are summarized in Tables 2 and 3 shown below, in terms of the total number H=0, 1, or 2 of significant horizontal neighbors, the total number V=0, 1, or 2 of significant vertical neighbors, and the total number D=0, 1, 2, 3, or 4 of significant diagonal neighbors. Every possible configuration Csp is found in one row of the table.

TABLE 2

MQ-coder contexts for LL or LH code-blocks

| Msp | H | V | D |
|---|---|---|---|
| S0 | 0 | 0 | 0 |
| S1 | 0 | 0 | 1 |
| S2 | 0 | 0 | at least 2 |
| S3 | 0 | 1 | anything |
| S4 | 0 | 2 | anything |
| S5 | 1 | 0 | 0 |
| S6 | 1 | 0 | at least 1 |
| S7 | 1 | at least 1 | anything |
| S8 | 2 | anything | anything |

TABLE 3

MQ-coder contexts for HH code-blocks

| Msp | H + V | D |
|---|---|---|
| S0 | 0 | 0 |
| S1 | 1 | 0 |
| S2 | at least 2 | 0 |
| S3 | 0 | 1 |
| S4 | 1 | 1 |
| S5 | at least 2 | 1 |
| S6 | 0 | 2 |
| S7 | at least 1 | 2 |
| S8 | anything | at least 3 |

The ad hoc correspondence for HL blocks is identical to that for LL or LH blocks except that the role of H and V are reversed.

Each bit-value coded in the significance-propagation pass of JPEG 2000 coding is coded using the corresponding context value Msp. If the coded bit-value is 0, the given coefficient index has not yet become significant (blossomed in our terminology used in the present application) and is ignored until the next bit-plane is coded.

If the coded bit-value is 1, the given coefficient has just blossomed. The sign bit for the given coefficient index is coded immediately thereafter. This coding operation also requires determination of a context. The sign-bit context is determined from a configuration Csb corresponding to the significance states and the signs, if significant, of the four immediate neighbors (located immediately above, below, right, or left of—but not diagonally offset from—the given coefficient being coded. Since each of the four immediate neighbors has three possible states (insignificant, significant and positive, or significant and negative), the number of such possible configurations is $3^4=81$. The JPEG 2000 Specification stipulates that the MQ-coder context value, Msb, used to code the sign bit, take one of five MQ possible values arbitrarily labeled S9-S13 that can be determined from the configuration value Csb by an ad hoc correspondence Asb: Msb=Asb(Csb). In addition, a default sign-bit value Dsb is derived from Csb by an ad hoc correspondence Bsb: Dsb=Bsb(Csb). Once again, the evaluation of Asb(Csb) and Bsb(Csb), if performed in known JPEG 2000 implementations by logical operations, is a significant computational burden.

Details of the ad hoc correspondence used to calculate Msb and the default sign bit Dsb are given in Table 4 shown below in terms of the total number H+=0, 1, or 2 of positive significant horizontal neighbors, the total number H−=0, 1, or 2 of negative significant horizontal neighbors, the total number V+=0, 1, or 2 of positive significant vertical neighbors, and the total number V−=0, 1, or 2 of negative significant vertical neighbors. This correspondence is the same for LL, LH, HL, or HH code-blocks.

TABLE 4

| Msb | Dsb | (H+) − (H−) | (V+) − (V−) |
|---|---|---|---|
| S9 | + | 0 | 0 |
| S10 | + | 0 | positive |
| S10 | − | 0 | negative |
| S11 | + | positive | negative |
| S11 | − | negative | positive |
| S12 | + | positive | 0 |
| S12 | − | negative | 0 |
| S13 | + | positive | positive |
| S13 | − | negative | negative |

Note that MQ-coder context S9 is used only with default sign-bit value +.

The major computational tasks in the significance-propagation pass are:

1) Determining whether each bit-value of the current bit-plane is coded in the significance-propagation pass;
2) Assembling the neighborhood configurations Csp and Csb; and
3) Evaluating the coding contexts Asp(Csp) and Asb(Csb) and the default sign-bit value Bsb(Csb).

Depending on the method of implementation, these tasks may overlap and, in most implementations, involve a large number of computations.

The second of the three JPEG 2000 coding passes for a given bit-plane is the magnitude-refinement pass. This coding pass will now be discussed. In the magnitude-refinement pass, bit-values are coded for those coefficient indices which:

1) became significant before the current bit-plane.

This condition is independent of the particular specified scanning pattern. The choice of MQ-coder context used for each bit-value is determined by the significance state of the given coefficient index's eight neighbors, and on whether the coefficient became significant with the immediately preceding bit-plane or earlier. We let Cmr denote the configuration of the eight neighbors' significance states. The possible number of such configurations is $2 \times 2^8 = 512$.

The JPEG 2000 Specification stipulates that the MQ-coder context value, Mmr, used to code the current bit-value, take one of three possible values arbitrarily labeled S14-S16 and that it be derived from the configuration value by an ad hoc correspondence Amr: Mmr=Amr(Cmr). This correspondence is considerably simpler than the previously mentioned Asp, Asb, and Bsb relationships, but still represents a nontrivial computational burden.

Major computational tasks in the magnitude-refinement pass include:

1) Determining whether each bit-value of the current bit-plane is coded in the magnitude-refinement pass;
2) Assembling the neighborhood configuration Cmr; and
3) Evaluating the coding context Amr(Cmr).

The third of JPEG-2000's three coding passes for a given bit-plane is the clean-up pass. The clean-up pass will now be discussed. In the clean-up pass, bit-values are coded for those coefficient indices which were not coded in the significance-propagation or magnitude-refinement passes. Note that all such coefficients must be insignificant.

The choice of MQ-coder context for coding each bit-value and the sign bit-values of blossoming coefficients are determined in the same way as in the significance-propagation pass, using the neighborhood configurations Csp and Csb and the correspondences Asp and Asb. One important difference is that the bit-value is coded even if the MQ-coder context Asp(Csp) equals S0. All bit-values coded in the clean-up pass had values of S0 for Msp in the preceding significance-propagation pass; the value of Msp now differs if any neighboring coefficients became significant since the previous calculation.

Once again, the evaluation of Asp(Csp), Asb(Csb) and Bsb(Csb), if performed by logical operations as in known systems, is a significant computational burden.

The clean-up pass manifests an additional complication beyond the significance-propagation pass. In the case that all four coefficients of a column are insignificant and to be coded in the clean-up pass, and all fourteen neighboring coefficients of the column are insignificant, a special run-length code is used to indicate the number 0, 1, 2, 3, or 4 of zero bit-values from the top of the column downwards. The code has one or three bits, interpreted as in Table 5 shown below.

TABLE 5

| code | number of leading zeroes |
|---|---|
| 0 | 4 |
| 111 | 3 |
| 110 | 2 |
| 101 | 1 |
| 100 | 0 |

If the number of leading zeros is less than four (thus comprising less than the entire column) the first bit-value following is known to be 1. Calculation of Csp and Msp and the coding of this bit-value may therefore be omitted, but Csb, Msb, and Dsb must still be calculated and the sign bit decoded. For any subsequent bit-values in the column, both the bit-value and (if applicable) the sign bit must be coded, entailing the usual calculation of Csp, Msp, Csb, Msb, and Dsb. (Run-length coding is not used for columns containing fewer than four coefficients.) This run-length coding format enables a particular known rapid coding method, for one or several columns consisting entirely of zeros.

The major computational tasks in the JPEG-2000 coding clean-up pass are:
1) Determining whether each bit-value of the current bit-plane is coded in the clean-up pass;
2) Assembling the neighborhood configurations Csp and Csb; and
3) Evaluating the coding contexts Asp(Csp) and Asb(Csb) and the default sign-bit value Bsb(Csb).

Frequently one or several leading bit-planes for a code-block consist entirely of zeroes. All coefficients for a code-block are insignificant until a bit-value 1 is encountered. Note that for leading zero bit-planes no bit-values are code in the significance-propagation or clean-up passes. Effectively the first bit-plane coded for a code-block involves only the clean-up pass since no changes are made during the significance propagation and magnitude refinement pass performed on the first bit plane. The JPEG 2000 Specification allows leading zero bit-planes to be skipped in coding, but also permits such bit-planes to be explicitly coded.

In lossy image coding, some bit-values are typically left uncoded. In many cases, this is done by omitting one or more trailing coding passes in their entirety. This normally has no effect on the choice of bit-values to be coded and calculation of MQ-coder contexts described above.

Various principles of fast software execution that can be relevant to JPEG 2000 coding implementations will now be discussed. The computational complexity of JPEG 2000's coefficient bit modeling makes ways of providing rapid execution of JPEG 2000 encoding routines desirable. Instruction pipelining and parallelism is one way of facilitating rapid software execution. Even an ostensibly serial-execution microprocessor such as a Pentium manifests a significant degree of parallelism in instruction execution—parallelism profitably enhanced by careful code design. Execution of a single microprocessor operation such as an addition entails performance of several sub-tasks. The instruction itself must be fetched from memory, then interpreted. Perhaps one of the argument values must be again fetched from memory before the operation is actually performed. In order to execute a sequence of operations O1, O2, O3, . . . quickly, the processor "pipelines" the processing. For example, while operation O1 is actually being executed, simultaneously the argument value for operation O2 may be fetched from memory, operation O3 may be in the process of interpretation, and operation O4 may be fetched from memory. The details of this pipelining vary from one processor to another, but the basic principle is widespread.

Many modern microprocessors go even further by parallelizing execution, for example perhaps simultaneously executing operations O1 and O2, fetching arguments for operations O3 and O4, interpreting operations O5 and O6, and fetching operations O7 and O8. This parallelization is subject, however, to an important constraint. Operations O1 and O2 cannot be executed simultaneously if both must modify the same register or memory location (such a pair of operations is inherently sequential in nature). Careful code design, minimizing the immediate adjacency of such pairs of non-parallelizable operations, can theoretically increase execution speed by a factor of two over the worst case.

Pipelining of operations requires special finesse in the event that the program "branches", i.e., transfers control to a non-contiguous location in memory. Branches are a necessary feature for program loops and conditional execution and appear frequently in any but the most straightforward and uncomplicated programs.

A branch complicates the pipelining of operations because the operation to be executed two steps after operation O1 may not be the nearby operation O3 but an operation O100 at some distant memory location. It is therefore useless for the processor to interpret operation O3 simultaneously with the execution of O1. Microprocessors have grown increasingly sophisticated in their ability to pipeline operations separated by branches, but this sophistication entails unintended and undesired consequences if not accounted for in program design.

A program branch may be conditional or unconditional. An unconditional branch is simply a transfer of control which happens identically regardless of conditions. The unconditional branch is the easiest and was the earliest to be reconciled with instruction pipelining; the instructions fed into the pipeline are simply taken from the far end of the branch rather than immediately subsequent locations in memory.

A conditional branch may or may not take place depending on processor status when the branch instruction is reached. For example, the branch may or may not be executed depending on whether the result of the immediately preceding operation was positive, or negative, or an overflow. Conditional branches are difficult to reconcile with instructions to be pipelined because which of two possible locations the next instruction to be fed to the pipeline is located is impossible to predict given the information available at the time the instruction is fed.

The approach taken is to attempt to predict whether the branch will be taken based on previous history executing the same body of code. The details of the method used to make this prediction vary from one processor to another and are of little importance; the important point is that when the prediction is correct there is no interruption to the instruction pipeline. On the other hand, an incorrect prediction may, and often does entail a large time penalty.

Branch prediction is of greatest benefit when applied to a branch such as the end of a loop, which may be taken many times (once for each execution of the loop) and declined only once (when exiting the loop). The large time penalty for the final, incorrect prediction is thus offset by the many correct predictions which avoided interruption of the instruction pipeline.

Branch prediction is most problematic for a conditional branch which is repeatedly both taken and declined on an unpredictable basis.

Memory caching can also be used to facilitate fast software execution. Another feature of modern microprocessors is the use of a modest-size memory cache incorporated into the processor for rapid access to frequently used data. Blocks of memory (of a certain size dependent on the type of processor) are loaded into the cache as part of the block is accessed. This initial loading is a slow operation, but subsequent access of the same block is very fast. A well-designed program therefore refrains from repeatedly accessing memory in many widely dispersed locations in a limited time, as such would require different memory blocks to be repeated loaded into the cache with the associated delays.

Image encoding has found many applications and is often implemented using personal computers, workstations and/or other general purpose types of computers. In view of the above discussion, it should be appreciated that JPEG 2000 image encoding can be a very computationally complex. It should also be appreciated that methods of performing JPEG 2000 encoding in a relatively efficient manner that can be implemented using conventional general purpose computer systems, dedicated hardware or a combination of a general purpose computer and some dedicated hardware would be desirable. Preferably at least some methods should be capable of supporting relatively fast encoding of images.

SUMMARY OF THE INVENTION

The present application is directed to improved image encoding methods and apparatus, e.g., methods and apparatus suitable for use in JPEG 2000 image encoding applications. The present invention is directed to among other things, one or more of the following features which may be used alone or in combination to implement JPEG 2000's coefficient bit modeling:

1) Precompiled lists of coefficients for one or more of the three JPEG-2000 coefficient bit modeling coding passes.

2) Generation, updating and use of a neighborhood descriptor value table that stores neighborhood descriptor values which provide information about a current state associated with a coefficient and the state of neighboring coefficients.

In accordance with the list generation feature, a list of coefficients to be processed in a subsequent coding pass is generated in accordance with the invention during a current coding pass. For example, during significant propagation pass coding, a list of coefficients to be processed during the magnitude refinement pass or clean up pass may be generated. During the subsequent coding pass, e.g., the magnitude refinement or cleanup pass, coefficients which are not on the list to be processed during implementation of the particular coding pass to which the list corresponds are skipped facilitating rapid coding.

In accordance with the neighborhood descriptor value state table feature of the invention, a neighborhood descriptor value table is used to store neighborhood descriptor values which provide information about a current state associated with a coefficient and the state of neighboring coefficients. The stored neighborhood descriptor value corresponding to a coefficient is used during coding of the coefficient to which the particular neighborhood descriptor belongs to determine one or more control values, e.g., context values or a sign value, to be used during coding. For example, a coefficient's neighborhood descriptor value may be used in a table look-up operation to determine the MQ context for significance coding, 2) the MQ coder context value to be used for sign coding and/or 3) the default sign bit value to be used during MQ coding. The neighborhood descriptor state table normally includes one neighborhood descriptor value for each coefficient of a block being coded. During coding of a block, e.g., each time a coefficient first becomes significant as a result of a one first being encountered during encoding of the coefficient, the neighborhood descriptor value is updated to a new neighborhood descriptor value obtained from a look-up table which provides neighbored descriptor value transition information. Whenever a coefficient becomes significant, in addition to updating the neighborhood descriptor value corresponding to the particular coefficient which has just become significant, the neighborhood descriptor values corresponding to each of the coefficient's immediately adjacent neighbor's within the code block are also updated. The updating of the adjacent neighbor's neighborhood descriptor values is performed by using an information look-up table to determine the neighbor's new descriptor value based on the neighbor's existing descriptor value at the time of the update and the neighbor's location relative to the coefficient which just became significant and trigged the update of the neighborhood descriptor value. For example, a different sets of update values are provided to be used for vertically adjacent neighbors, horizontal neighbors and diagonal neighbors were the location is relative to the coefficient which became significant triggering the update. In the case of horizontal and vertical values, the sign of the bit being processed can be taken into consideration when determining the next neighborhood state value from the table with different values being provided depending on the sign of the bit. While the number of different state values which are used to identify different neighborhood states in accordance with the invention is normally less than 256, in many cases the total number of different possible neighborhood descriptor values which are used is much lower, e.g., less than 100 and in some embodiments even less than 50.

The context value and/or default sign value bit determined from the neighborhood descriptor information look-up table of the present invention which relates neighborhood descriptor values to encoding control values, are used to encode the particular coefficient to which a descriptor value corresponds. As part of the performed coding operation, one or more parameters internal to the MQ encoder are updated in accordance with normal MQ encoder procedures. In addition, as the coding progresses and a coded bit value is produced, the coded bit value generated by coding one or more coefficient values is output by the encoder, and then stored and/or transmitted. Thus, while a coded bit value may not be output for each coefficient value which is coded, the coding of at least some coefficient values will result in the completion of a coded bit value which is output for storage and/or transmission. Over time, a full set of coded bit values will be generated and output for storage and/or transmission.

Various features of the encoding methods and apparatus of the invention will now be discussed. Precompiled lists of coefficients for one or more coding passes may be used in accordance with the invention. In accordance with this feature, when used, a list of coefficients to be processed in a subsequent coding pass is generated during a current coding pass. When implementing the subsequent coding pass, coefficients on the list are processed with the other coefficients being skipped. This eliminates the need to examine all coefficients during some passes, to determine if processing is required or not during the particular pass. This can lead to significant computational advantages since generating the list of coefficients to be processed in accordance with the invention can be computationally more efficient than examining the coefficients during a coding pass to determine if a coefficient is to be processed during the particular pass.

Recall that JPEG 2000's coefficient bit modeling entails three coding passes over the code-block for each bit plane, a significance propagation pass, a magnitude refinement pass, and a clean-up pass. Each coding pass may include some coefficients and exclude others in a difficult-to-predict pattern based on the coefficient values surrounding each coefficient in a coefficient block which is being coded.

Examples of rapid implementation in the prior art focus on minimizing the number of operations required during a coding pass to determine whether each coefficient is included, e.g., to be processed, in the current coding pass. However, this approach, of attempting to efficiently determine during a coding pass, if each particular coefficient in a coefficient block is to be processed, overlooks a serious speed problem, the branch-prediction penalty associated with MQ-coding certain coefficients and skipping others in a complex and difficult-to-predict pattern. This branch-prediction penalty persists regardless of how rapid the decision to include or exclude a given coefficient and is potentially a major source of delay in all three coding passes.

As a general principle the branch-prediction penalty can be avoided if the coefficients to be coded can be listed prior to starting the coding pass. All coefficients in the list are then coded—thus avoiding the branch-prediction penalty associated with skipping certain coefficients.

Such a list yields a practical speed advantage if it can be created without incurring the same branch-prediction as stepping directly through the code-block in the traditional manner. For example, one of the criteria for inclusion in the significance-propagation pass (at least one significant neighbor at the time the given bit-value is coded) depends on the progress of the significance-propagation pass itself. Due of this dependence, a list of coefficients included in the significance-propagation pass effectively requires recreating the coding pass or using coding pass information.

However, the other coding passes are well-suited to the use of precompiled lists owing to the following fortuitous features of JPEG 2000's coefficient bit modeling:

1) Inclusion in the magnitude-refinement pass is independent of anything occurring in the magnitude-refinement pass or the immediately preceding significance-propagation pass; and
2) Inclusion in the clean-up pass is independent of anything occurring in the clean-up pass or the immediately preceding magnitude-refinement pass.

In the significance-propagation pass, the first pass of the coefficient bit modeling step, each coefficient should is examined for inclusion, e.g., coding during the significance-propagation pass. Previous methods would simply either MQ-code the next bit-value (and the sign bit, if applicable) if the coefficient was determined to be coded in the significance propagation pass, or skip over it if it was to be excluded from the coding performed in the significance propagation pass.

Various embodiments of the present invention do not merely skip a coefficient during significance propagation pass coding if it is excluded from coding during the significance-propagation pass. Rather, one additional comparison (whether the coefficient is significant before the current bit-value is coded) is made in accordance with the invention to determine whether the excluded coefficient belongs to, e.g., should be coded in, a subsequent coding pass, e.g., the magnitude-refinement pass or to the clean-up pass. Based on this decision, in such embodiments, the coefficient will be added to a list of coefficients to be processed in the magnitude-refinement pass if the decision indicates the coefficient is to be processed in the magnitude refinement pass. A decision may, alternatively, result in the coefficient being added to a list of coefficients to be processed in the clean-up pass. In some embodiments, list of coefficients to be processed in the magnitude refinement pass are generated but list of coefficients to be processed in the clean-up pass are not generated or used.

This additional computation required to determine if a coefficient is to be processed in a subsequent magnitude refinement and/or cleanup pass may introduce a small speed penalty for the significance-propagation pass but can greatly simplify and accelerate the subsequent magnitude-refinement pass and/or clean-up pass since the generated list can be access to determine which coefficients are to be coded in these passes.

Another feature of the invention which can be used alone or in combination with the generation of pre-computed lists of coefficients to be processed in a particular coding pass the use of a state machine for calculating the MQ-coder context to be used during encoding.

A state machine is a computational device having several possible states together with rules for transitioning from one state to another. A state machine as in the case of the present invention can be implemented on a general-purpose computer by using a variable to represent the state (the numeric value of which is generally irrelevant) and one or more look-up tables, taking a state value both as input and output arguments to specify, e.g., determine, various transitions in state values used to control the encoding.

For example, the MQ-coder as defined in the JPEG 2000 Specification can be implemented using a state machine which estimates probabilities. Each state of the machine represents a given probability of the symbol "1" occurring. A transition is made on each occurrence of a certain event in the MQ-coder and the nature of the transition depends on the value of the coded symbol. A symbol value "1" causes a transition to a new state reflecting a higher probability of the symbol value "1"; a symbol value "0" causes a transition to a new state reflecting a lower probability of the symbol value "1."

The seventeen MQ-coder contexts S0-S16 used in JPEG 2000's coefficient bit modeling can be implemented as seventeen separate state machines, each reflecting a probability value for its particular coding context.

An innovation of the present invention is the introduction of one or more additional state machines whose purpose is to calculate the coding context for each bit value coded in coefficient bit modeling. In effect, one or more secondary state machines of the present invention are used to select the primary state machine with which the MQ-coder calculates the probability associated with each coded bit value.

Recall, for example, that in JPEG 2000 the significance-propagation pass derives the MQ-coder context Msp for coding the current bit value from the configuration Csp of the eight immediate neighbors via an ad hoc correspondence Asp: Msp=Asp(Csp). This ad hoc correspondence reduces the 256 possible neighborhood configurations to only nine MQ-coder contexts S0-S8.

When one of a coefficient's eight immediate neighbors N blossoms, that coefficient's neighborhood configuration Csp is modified by a transformation TN: Csp(new)=TN(Csp), inducing a change in the MQ-coder context: Msp(new)=Asp(Csp(new)). Previous methods attempt to minimize the number of operations required to evaluate (compute) the new neighborhood configuration Csp(new) and the ad hoc correspondence Asp.

The present invention eliminates the need to maintain the neighborhood configuration Csp (and hence to calculate Csp(new)). The key to this is the observation that whenever two distinct neighborhood configurations Csp1 and Csp2 yield the same MQ-coder context Msp via the ad hoc correspondence Asp, the new neighborhood configurations Csp1(new)=TN(Csp1) and Csp2(new)=TN(Csp2) also yield the same MQ-coder context Msp(new) via Asp. In other words, knowledge of the previous MQ-coder context Msp suffices to determine neither the old neighborhood configuration Csp nor the new neighborhood configuration Csp (new), however, the inventors of the present application realized that it does suffice to determine the new MQ-coder context Msp(new)=Asp(Csp(new))=Asp(TN(Csp)) and that it can be stored and used for making such a determination.

In various embodiments of the invention, the various MQ-coder context values to be used are calculated by one or more state machines which use a coefficient's neighborhood descriptor value to determine the context value to be used to control encoding. Separate state machines, e.g., look-up tables and control logic used to retrieve information from the look-up tables, may be used to calculate the different MQ-coder contexts for:

A. Bit-values in the significance-propagation or clean-up pass for LL, HL, or LH coefficients;
B. Bit-values in the significance-propagation or clean-up pass for HH coefficients; and
C. Sign bits in the significance-propagation or clean-up pass.

However, as discussed below, some of these state machines which are used in accordance with the invention can be combined for simplicity, e.g., into a single large state machine that can be implemented as a single large information look-up table. For example, in one such embodiment, a single look-up table is used. The single information look up table in the particular exemplary embodiment includes 1) MQ context values for significance coding, 2) MQ coder context values for sign coding and 3) default sign bit values to be used for MQ coding. A different state value is used in the table as an index for each possible combination of the three different values which may occur in a system.

In other embodiments multiple smaller information look-up tables are used, e.g., with different lookup tables being used for coefficients of different types and/or for different encoding control values to be determined.

In one exemplary implementation, a state machine A has nine states A0-A8. The labels designating these states are arbitrary; the labels A0-A8 correspond to the nine MQ-coder contexts 0-8 described in the JPEG 2000 Specification. The initial state A0 corresponds to a neighborhood configuration of all insignificant coefficients. (With a few special exceptions) three types of transition can be made from each state, triggered when a horizontal neighbor, a vertical neighbor, or a diagonal neighbor blossoms (becomes significant). For example, for an LL coefficient, from state A0: blossoming of a horizontal neighbor causes a transition to state A5 ; blossoming of a vertical neighbor causes a transition to state A3 ; and blossoming of a diagonal neighbor causes a transition to state A1. The results of the possible transitions from each of the states A0 through A8, are shown in Table 6 below. There is no vertical transition from state A4 because state A4 can be reached only after both vertical neighbors have become significant. Similarly, there is no horizontal transition from state A8.

The state machine for LH coefficients can be identical to the LL table as the ad hoc correspondences for LL and LH coefficients are identical. The state machine for HL coefficients is the same except the horizontal and vertical transitions are reversed. The nine states of State Machine A and the transitions between them are shown schematically in FIG. 15 which includes a state transition diagram 1500.

In one exemplary implementation a State machine B for HH coefficients which has nine states B0-B8 is used. The labels designating these states are arbitrary; the labels B0-B8 correspond to the nine MQ-coder contexts 0-8 described in the JPEG 2000 Specification. The pattern of transitions for HH coefficients differs from that for LL, LH, or HL coefficients and are as shown in Table 7 below.

TABLE 6

| Starting state | Type of transition | | |
|---|---|---|---|
| | Horizontal | Vertical | Diagonal |
| A0 | A5 | A3 | A1 |
| A1 | A6 | A3 | A2 |
| A2 | A6 | A3 | A2 |
| A3 | A7 | A4 | A3 |
| A4 | A7 | n/a | A4 |
| A5 | A8 | A7 | A6 |
| A6 | A8 | A7 | A6 |
| A7 | A8 | A7 | A7 |
| A8 | n/a | A8 | A8 |

TABLE 7

| Starting state | Type of transition | | |
|---|---|---|---|
| | Horizontal | Vertical | Diagonal |
| B0 | B1 | B1 | B3 |
| B1 | B2 | B2 | B4 |
| B2 | B2 | B3 | B5 |
| B3 | B4 | B4 | B6 |
| B4 | B5 | B5 | B7 |
| B5 | B5 | B5 | B7 |
| B6 | B7 | B7 | B8 |
| B7 | B7 | B7 | B8 |
| B8 | B8 | B8 | B8 |

As horizontal and vertical transitions always yield the same result in the case of HH coefficients, State machine B can be implemented using two types of transition: normal and diagonal. The nine states of State Machine B and the transitions between them are shown schematically in FIG. 16 which shows the state transition diagram 1600.

In addition to state machines A and B which can be implemented using look-up tables 6 and 7 respectively, an additional state machine referred to as State machine C, may also be used. State machine C has nine states C9+, C10−, C10+, C11−, C11+, C12−, C12+, C13−, C13+. The labels designating these states are arbitrary; the values 9-13 correspond to the five MQ-coder contexts 9-13 described in the JPEG 2000 Specification, while the + or − designation corresponds to the default sign bit value as described in the JPEG 2000 Specification (There is no C9− state because according to the JPEG 2000 Specification, MQ-coder context 9 is used only with the default sign value +.) The initial state is C9+, corresponding to a neighborhood configuration of all insignificant coefficients. Four types of transition can be made from each state depending on whether a horizontal or vertical neighbor blossoms and on the sign of that neighbor. For example, from state C9+: blossoming of a horizontal neighbor to a positive value causes a transition to state C12+; blossoming of a horizontal neighbor to a negative value causes a transition to state C12−; blossoming of a vertical neighbor to a positive value causes a transition to state C10+; and blossoming of a vertical neighbor to a negative value causes a transition to state C10−. The results of each of the possible transitions from each of the possible states are shown in Table 8 below.

TABLE 8

| Starting state | Type of transition | | | |
|---|---|---|---|---|
| | Horizontal/+ | Horizontal/− | Vertical/+ | Vertical/− |
| C9+ | C12+ | C12− | C10+ | C10− |
| C10+ | C13+ | C11− | C10+ | C9+ |
| C10− | C11+ | C13− | C9+ | C10− |
| C11+ | C11+ | C10− | C12+ | C11+ |
| C11− | C10+ | C11− | C11− | C12− |
| C12+ | C12+ | C9+ | C13+ | C11+ |
| C12− | C9+ | C12− | C11− | C13− |
| C13+ | C13+ | C10+ | C13+ | C12+ |
| C13− | C10− | C13− | C12− | C13− |

The nine states of State Machine C shown in table 8 and the transitions between them are shown schematically in FIG. 17 which is a state transition diagram 1700.

In various practical implementations which use one or more of these state machines, the state machines are implemented using look-up tables.

In various embodiments, decoding coefficients for an LL, LH, or HL code-block in accordance with the invention entails use of State machines A and C. Decoding coefficients for an HH code-block entails use of State machines B and C. Each blossoming of a coefficient entails state-machine transitions for the two state machines used for all eight neighboring coefficients—sixteen transitions in all.

The number of computations required for these transitions can be halved, however, by combining State machines A and C into a larger State machines D and E and combining State machines B and C into a larger State machine F.

A State machine D, which can be implemented using table 2100, is used for coding LL or LH coefficients in some embodiments. Exemplary state machine D has 30 states, with 27 of the states representing a pair of states from State machine A and State machine C. For example State D0 is equivalent to State A0 combined with State C9+ and State D11 is equivalent to State A6 combined with State C12−. Although there are 9×9=81 such pairings of states from State machine A and State machine C, only 27 such, labeled as States D0-D26, are actually reachable by a sequence transitions. Each state has five transitions, of type Horizontal +, Horizontal −, Vertical +, Vertical −, and Diagonal. Associated with each state are three additional pieces of information: the MQ-coder context for coding a significance bit, the MQ-coder context for coding a sign bit, and the default sign value. An additional three states, labeled D48, D49, and D50, are used in magnitude-refinement coding. These states lack the sign-bit context and default sign value data attributes, since the sign is already determined for any wavelet coefficient coded in the magnitude-refinement pass. Look-up tables describing State machine D are shown in FIG. 21. Each state corresponds to a different neighborhood descriptor values D0 through D50 which is used as an index into the look-up table 2100. Thus, in the FIG. 21 example, a different neighborhood descriptor value is used for each possible unique combination of MQ coder context values listed in columns 2114, 2116 and sign value listed in column 2118.

Similarly, State machine E, which can be implemented using information table 2200 is used for coding HL coefficients. State machine E has 30 states, with 27 representing a pair of states from State machine A and State machine C. Most of the look-up tables for State machine E are shared with State machine D; the only exceptions being the tables giving the MQ-coder context for coding the sign bit and the default sign value. The additional look-up tables describing previously described State machine D are incorporated into the lookup table 2100 as shown in FIG. 21.

Similarly, State machine F, which can be implemented using table 2300, is used for coding HH coefficients in some embodiments, has 50 states, with 47 representing a pair of states from State machine B and State machine C. Although there are 9×9=81 such pairings of states from State machine A and State machine C, only 47 such, labeled as States F0-F46, are actually reachable by a sequence transitions. Each state has five transitions, of type Horizontal +, Horizontal −, Vertical +, Vertical −, and Diagonal. Associated with each state are three additional pieces of information: the MQ-coder context for coding a significance bit, the MQ-coder context for coding a sign bit, and the default sign value. An additional three states, labeled F48, F49, and F50, are used in magnitude-refinement coding. These states lack the sign-bit context and default sign value data attributes, since the sign is already determined for any wavelet coefficient coded in the magnitude-refinement pass. Look-up tables describing State machine D are shown in FIG. 23. 50 states is still quite a manageable number, as a single 8-bit byte suffices to store up to 256 distinct state values.

In accordance with the invention, the different information look-up tables corresponding to the different types of wavelet coefficients can be stored in memory. At encoding time, the table matching the type of coefficients in a block of coefficients to be processed is selected for use in coding the block of coefficients. For example, when coding an LL block of coefficients, the information table including neighborhood state descriptor information and encoding context information for LL coefficients would be used.

While various exemplary state tables have been described, it will be appreciated that variations on how the state tables of the present invention are implemented, e.g., as a single table or multiple tables, are possible while staying within the scope of the present invention.

Numerous additional features, benefits and possible embodiments which use one or more of the methods and apparatus of the present invention are discussed in the detailed description which follows.

BRIEF DESCRIPTION OF THE FIGURES

FIG. 21 illustrates an exemplary state machine in the form of an information look-up table for LL or LH wavelet coefficients.

FIGS. 23A and 23B illustrate an exemplary state machine in the form of an information look-up table for HH wavelet coefficients.

DETAILED DESCRIPTION

The present invention is directed to methods and apparatus for performing encoding operations, e.g., MPEG 2000 encoding operations. Various feature of the present invention are directed to a novel MQ encoder implementation which can perform JPEG2000 MQ encoding operations in a hardware and/or implementation efficient manner.

Figure 1:
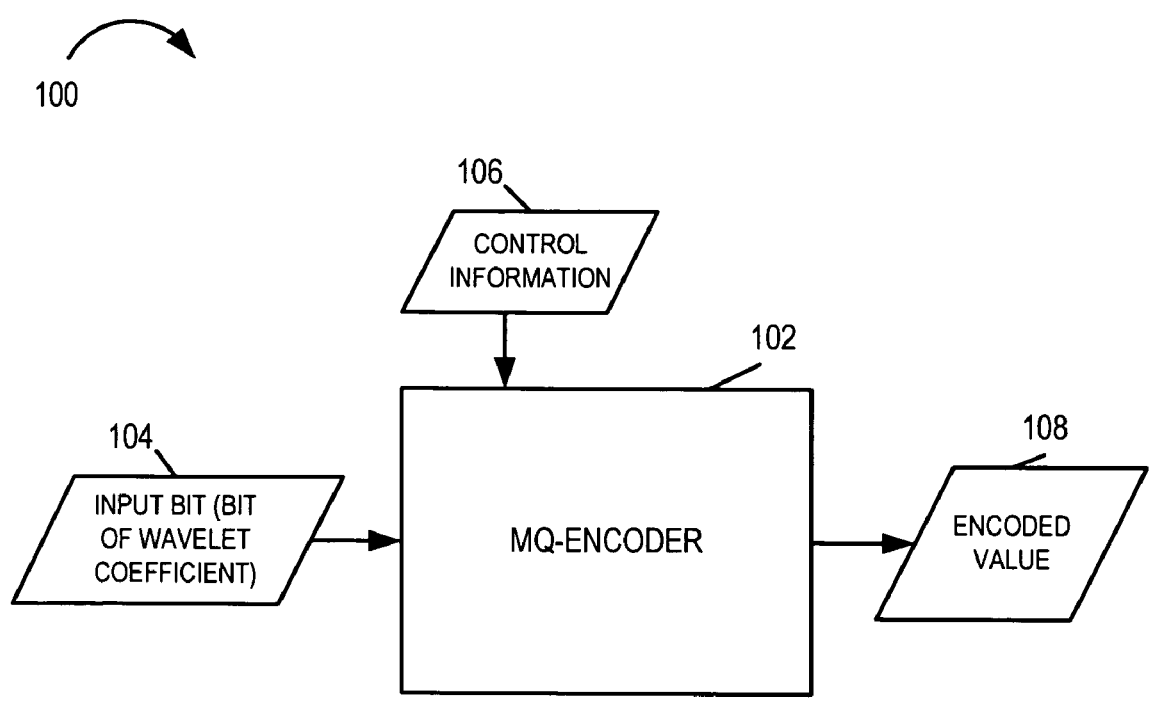
FIG. 1 illustrates an exemplary encoder.

FIG. 1 illustrates an exemplary encoding system 100 implemented in accordance with the invention. The encoding system includes an MQ encoder 102 implemented in accordance with the present invention. The MQ encoder receives as its inputs control information 106 and data to be encoded, e.g., a set of input bits corresponding to a code block which is to be subject to MQ encoding. The MQ encoder of the present invention generates a set of encoded values 108.

Figure 2:
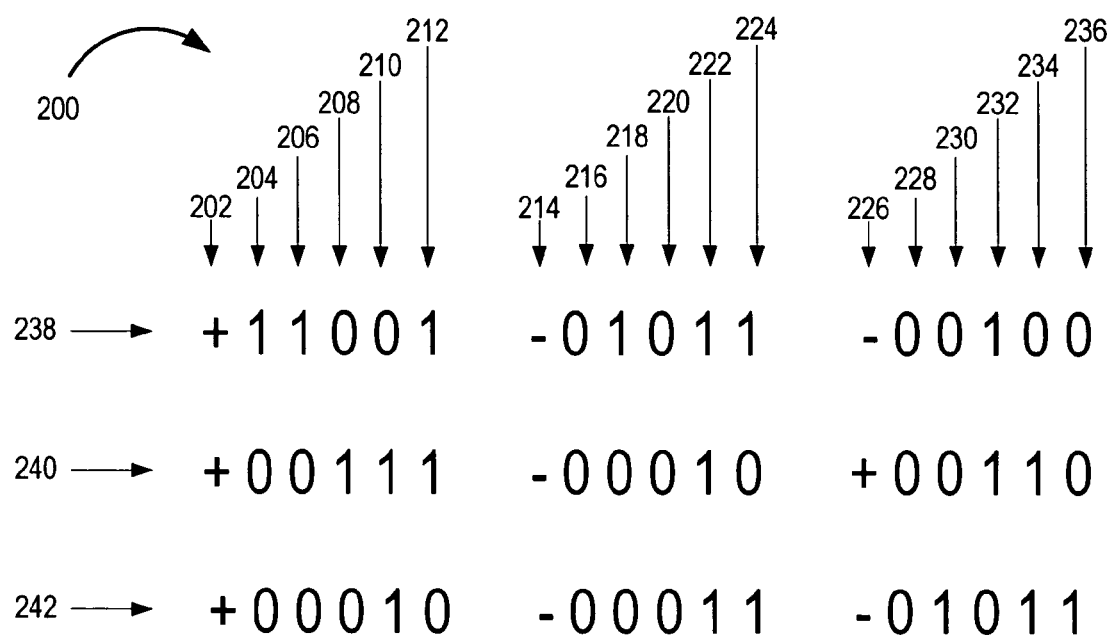
FIG. 2 illustrates an exemplary block of wavelet values to process as part of a JPEG2000 encoding process implemented in accordance with the invention.

FIG. 2 illustrates an exemplary 3×3 block 200 of wavelet coefficient values to be processed. The exemplary block 200 may be used as the input set of bits 104 to the MQ encoder 102 shown in FIG. 1, with sequencing and control information determined by the algorithms described in FIGS. 9-13. This exemplary block of coefficients has 5 bit-planes in addition to the set of sign bits located in columns 202, 214, 226. The bit-planes are encoded sequentially from leftmost (in columns 204, 216, 228) to rightmost (in columns 212, 224, 236), with the sequencing within each bit-plane determined by the algorithms described in FIGS. 9-13. Columns 202-212 indicate the first column of wavelet coefficients Columns 214-224 indicate the second column of wavelet coefficients. Columns 226-236 indicate the third column of wavelet coefficients. 238, 240, and 242 each indicate one row of wavelet coefficients.

Figure 3:
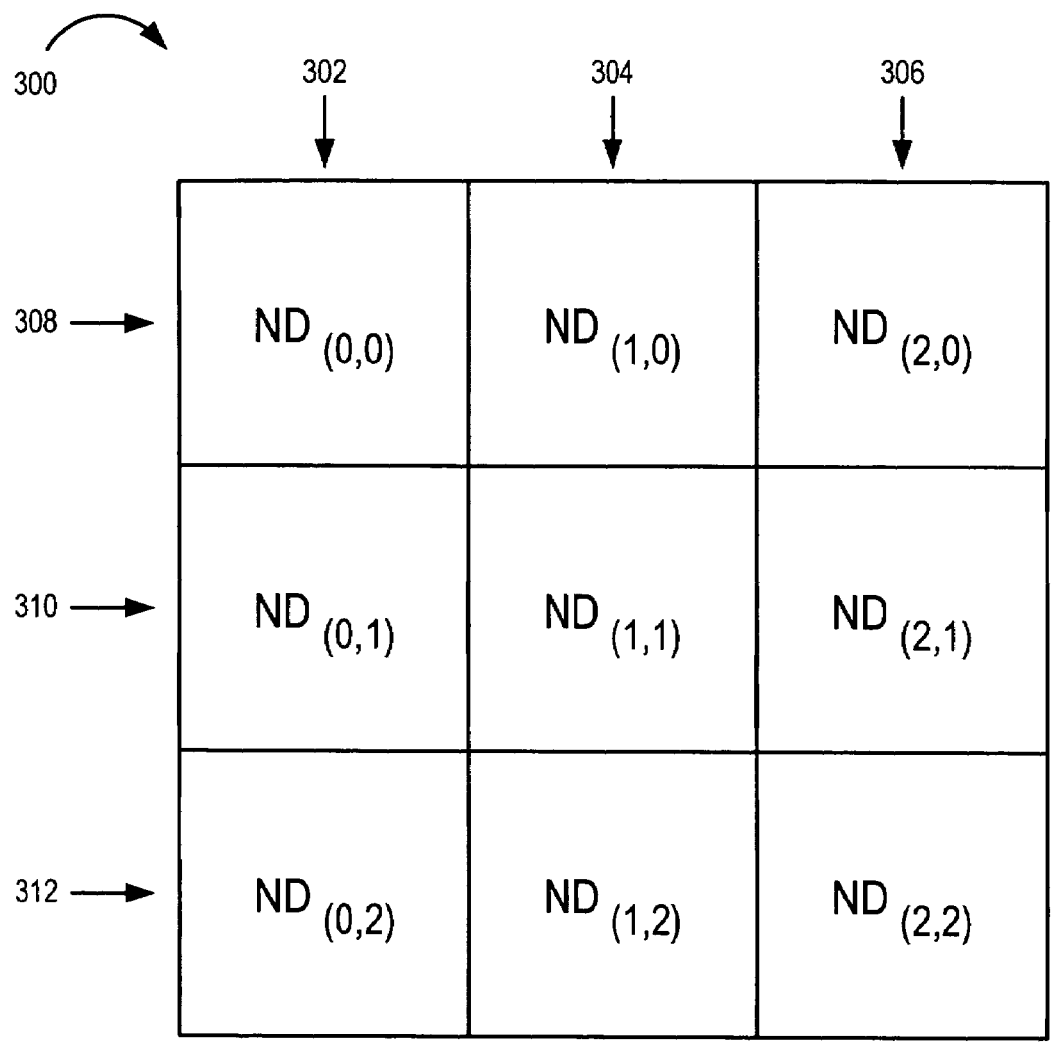
FIG. 3 illustrates an exemplary data coefficient state table for a 3×3 set of wavelet coefficients which can be used as part of an encoding process implemented in accordance with the invention.

FIG. 3 illustrates an exemplary data coefficient state table (DCS) 300, which can be used, in accordance with the present invention, to encode a 3×3 set of wavelet coefficients. Each entry in the table corresponds to one of the coefficients in a coeffient block to be coded, e.g., the 3×3 coefficient block of FIG. 2. Rows 308, 310, and 312 correspond to rows 238, 240, and 242, respectively. Columns 302, 304, and 306 correspond to the columns of wavelet coefficients indicated by 202-212, 214-224, and 226-236, respectively. Each entry of the DCS table 300 is used to store a state value which provides neighborhood state information that is used, in accordance with the invention, for coding purposes. The exemplary DCS table 300 will be used in the description provided below to explain the invention with regard to an example of using the invention to encode the exemplary coefficient block 200.

Figure 14:
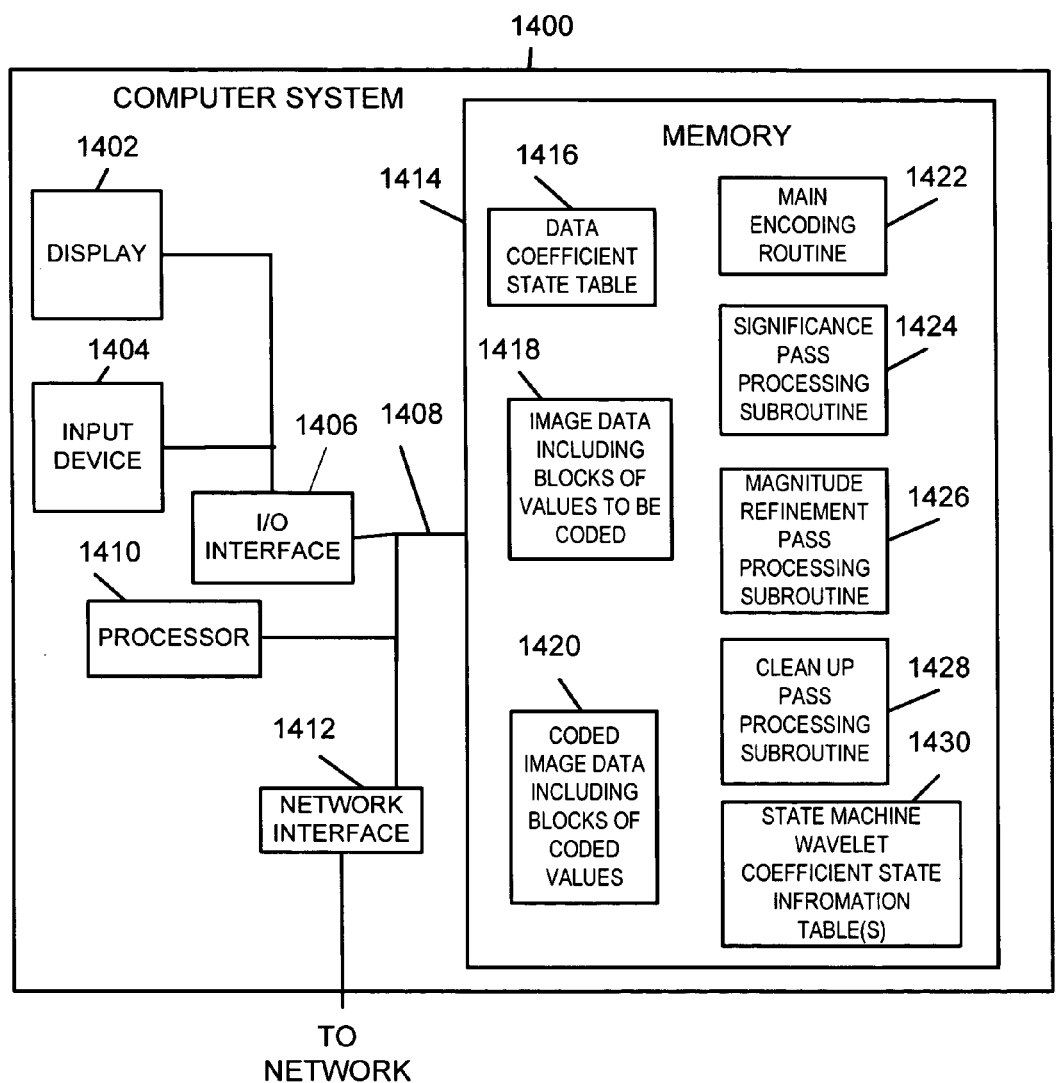
FIG. 14 illustrates an exemplary computer system which includes various routines and subroutines which, when executed, cause the computer system to perform one or more encoding operations in accordance with the present invention.

FIG. 14 illustrates a computer system 1400 which can be used to perform encoding operations in accordance with the present invention. The computer system 1400 includes a display device 1402, input device 1404, I/O interface 1406, processor 1410, network interface 1412 and memory 1414 which are coupled together by bus 1408. The display device 1402 can be used for displaying encoder settings, input data and resulting coded blocks generated in accordance with the present invention. Input device 1404 can be used for inputting commands, operator selections and/or encoder control information. The I/O interface 1406 interfaces between the input device 1404 and output device 1402 and various other system components such as the processor 1410 and memory 1414 which are coupled to the I/O interface 1406 via bus 1408. The network interface 1412 is coupled to the bus 1408 and to a network 1412 providing a way for the computer system 1400 to receive image data to be coded and to output coded blocks of values produced by the coding methods of the invention.

The memory 1414 includes various sets of data, e.g. data coefficient state table 1416, image data including blocks of values to be coded 1418 and coded image data including blocks of coded values 1420. The data coefficient state table includes values generated as part of the encoding process of the present invention. Values in the state table 1416 are updated as the coding pass progresses, e.g., as discussed above in regard to the example shown in FIGS. 3-8B. Image data 318 includes stored blocks of values to be coded. These values are subject to encoding in accordance with the present invention to generated coded image data 1420 which includes JPEG 2000 compliant coded blocks of values generated in accordance with the present invention.

Encoding in accordance with the present invention is implemented by the general purposes processor 1410, under control of the main encoding routine 1422 which calls the various subroutines 1424, 1426, 1428. Table(s) 1430 are novel state information tables implemented in accordance with the present invention that are used. The various subroutines use state machine wavelet coefficient state information table(s) 1430 to determine various coding values in accordance with the present invention.

Figure 9A:
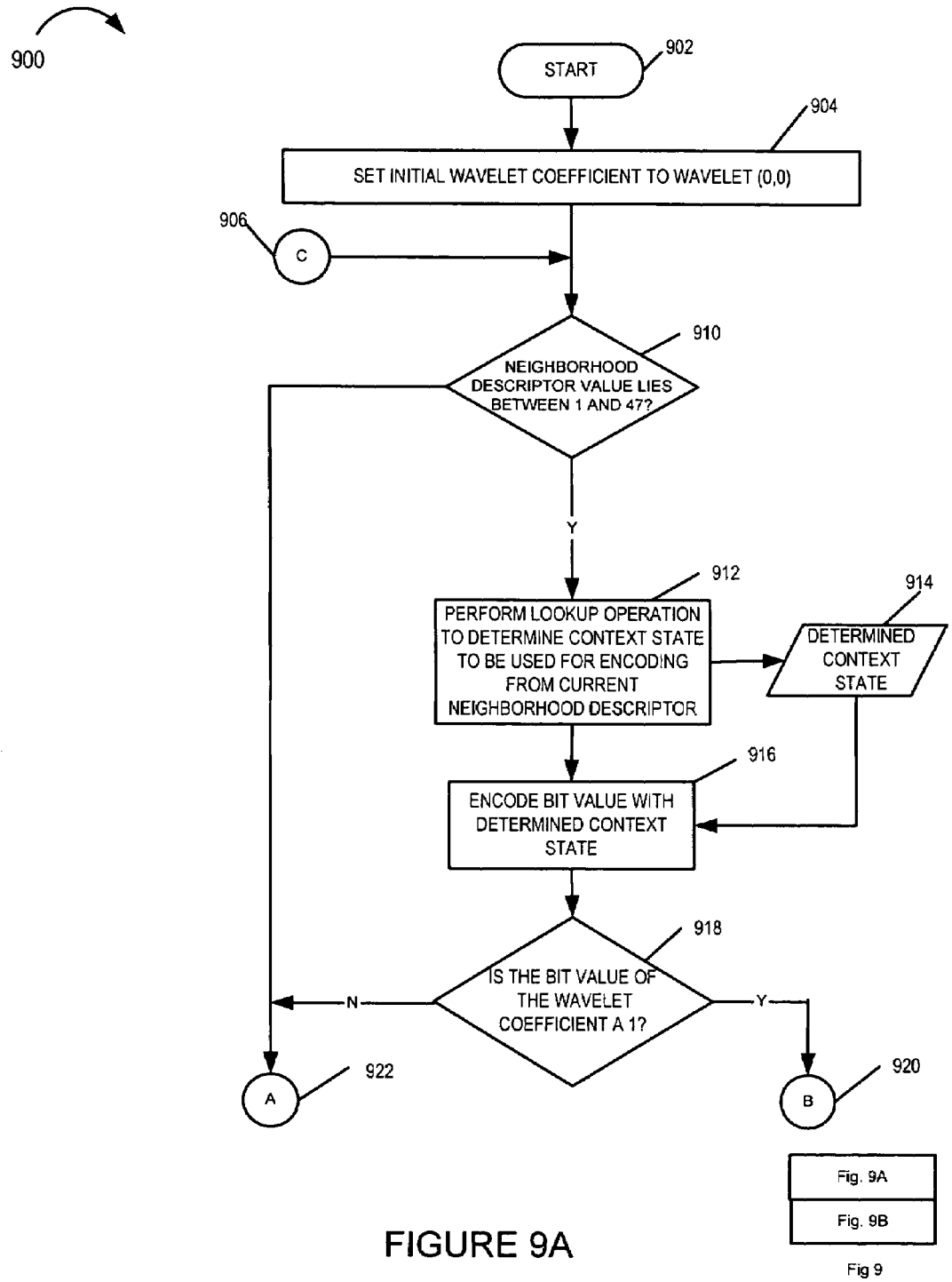
FIGS. 9A and 9B illustrate the steps of an exemplary significance-propagation pass processing method implemented in accordance with the present invention.
Figure 9B:
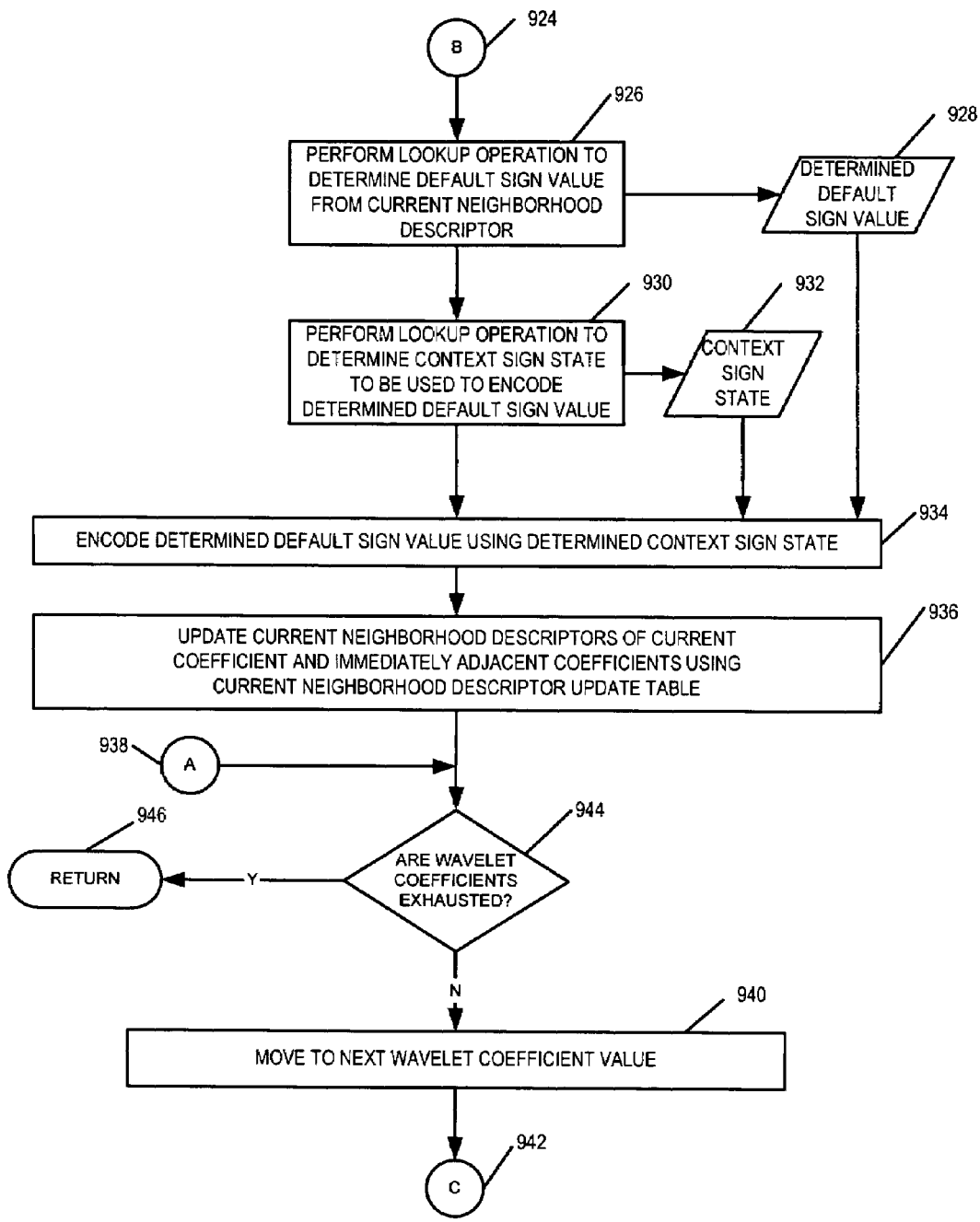
Figure 10:
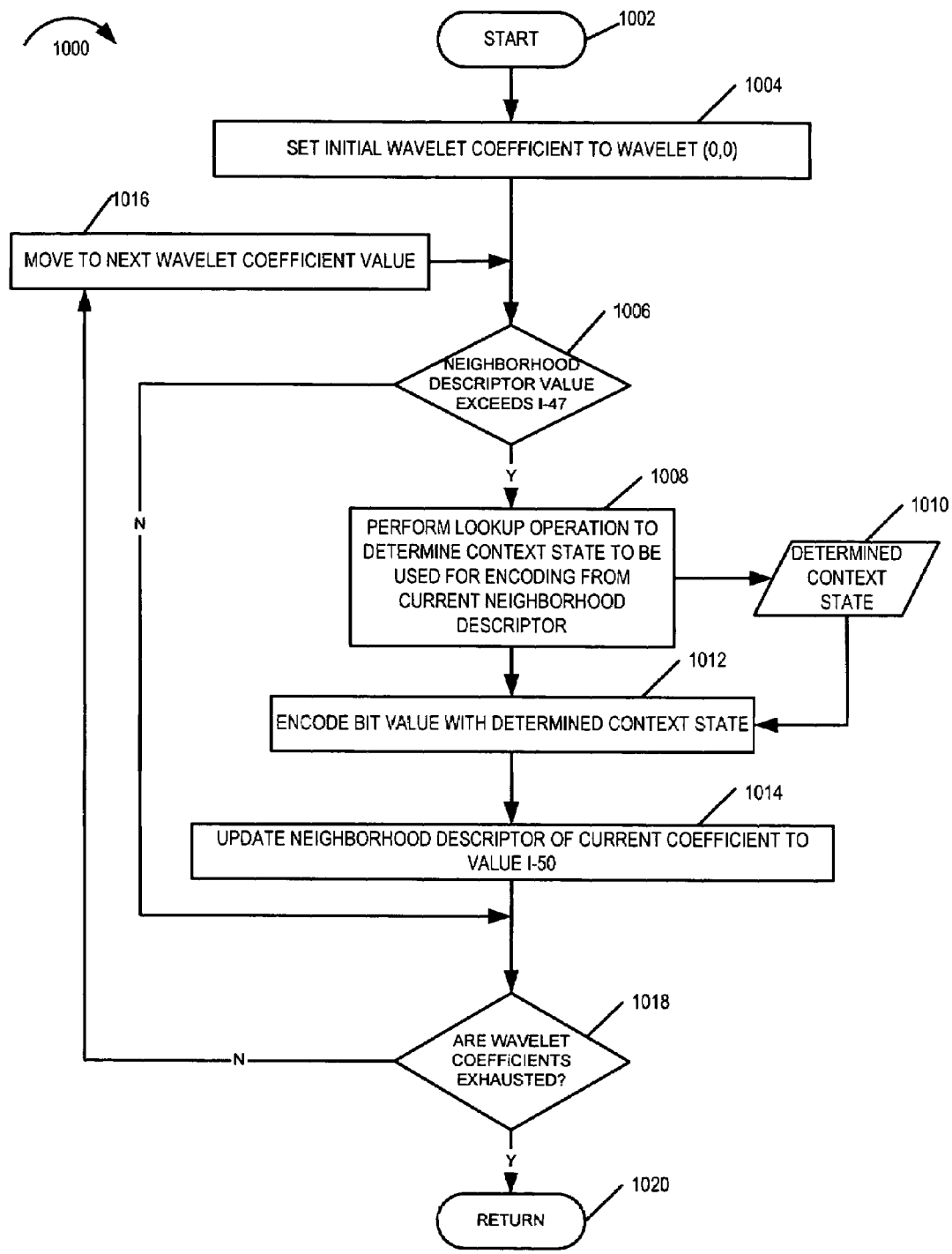
FIG. 10 illustrates the steps of a magnitude-refinement pass encoding subroutine implemented in accordance with the present invention.

Flow chart 1300 illustrates the steps of an exemplary main encoding routine 1422 implemented in accordance with the invention. Flow chart 900 of FIG. 9 illustrates the steps of an exemplary significance pass processing subroutine 1424. Flow chart 1000 of FIG. 10 illustrates the steps of an exemplary magnitude refinement pass processing subroutine 1426 while flow chart 1100 of FIG. 11 illustrates the steps of an exemplary clean up pass processing subroutine 1428.

Figure 4:
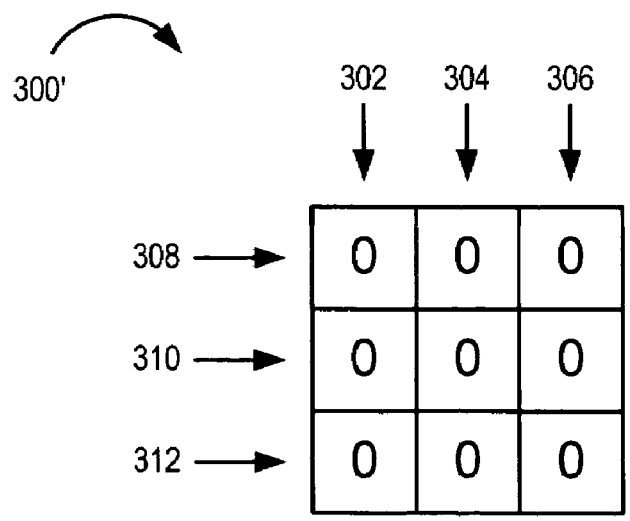
FIG. 4 illustrates a data state table of the type shown in FIG. 3 after initialization of the table values to state 0 for each of the table entries.
Figure 13:
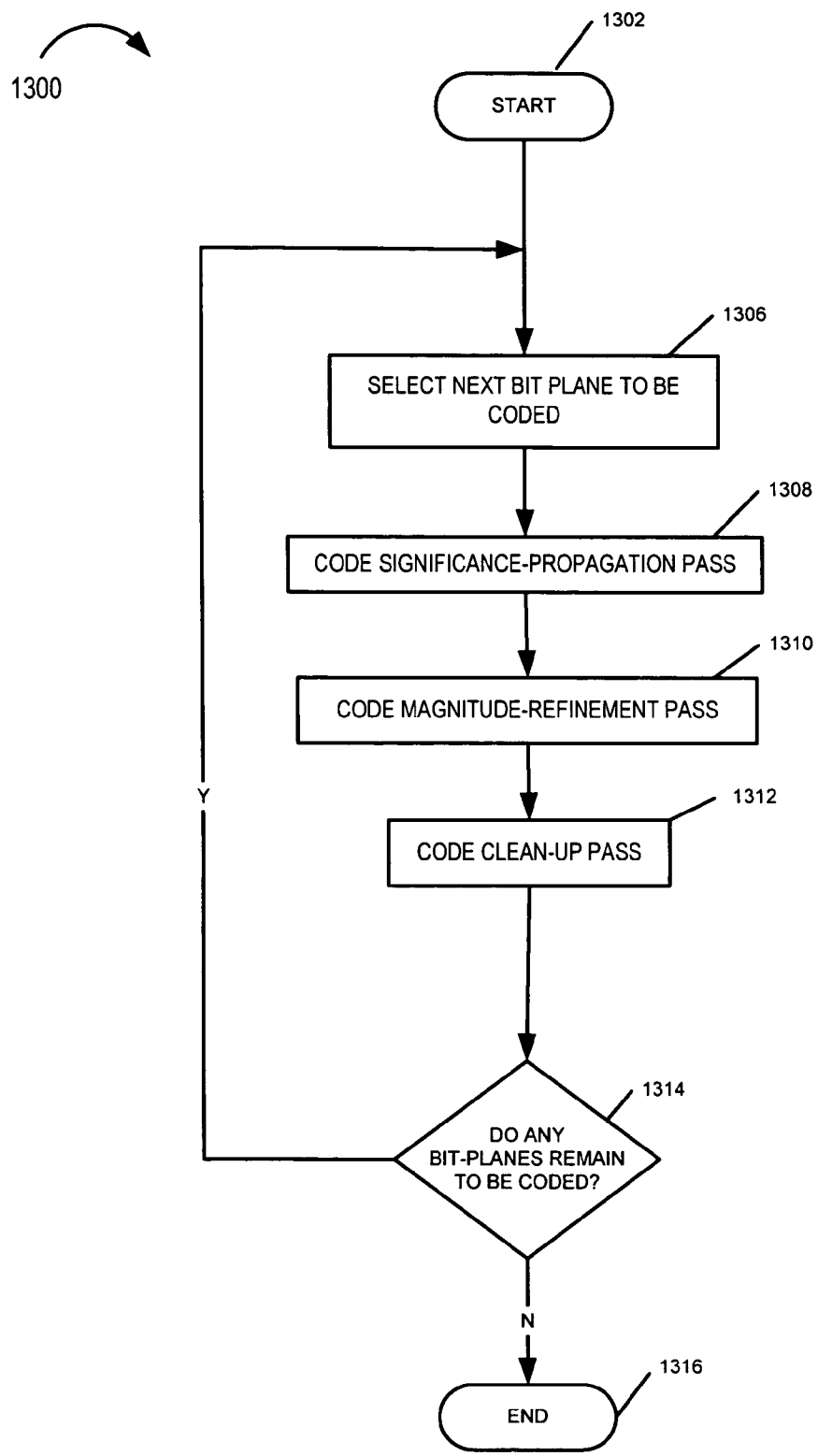
FIG. 13 illustrates the steps of a main encoding routine which calls various subroutines implemented in accordance with the present invention to perform an encoding operation.

An exemplary method of the complete coding operation for a single code-block of coefficients in accordance with the method of present invention will now be discussed with reference to FIG. 13. The routine 1300 starts in step 1302. At this point, the neighborhood descriptor table 300 has been initialized to its initial state as shown in FIG. 4. Operation then proceeds to step 1304.

In step 1306, the next bit-plane to be coded is selected. Bit-planes are coded in order from left (most-significant) to right (least-significant). The leftmost bit-plane containing any nonzero bit-values for any coefficient is the first coded. Operation then proceeds to step 1308.

In step 1308 the significance-propagation pass for the current bit-plane is coded as prescribed by procedure 900. For the very first bit-plane coded, it happens that no bit-values meet the criterion for coding in the significance-propagation pass and therefore this procedure has no effect. Operation then proceeds to step 1310.

In step 1310 the magnitude-refinement pass for the current bit-plane is coded as prescribed by procedure 1000. For the very first bit-plane coded, it happens that no bit-values meet the criterion for coding in the magnitude-refinement pass and therefore this procedure has no effect. Operation then proceeds to step 1312.

In step 1312 the clean-up pass for the current bit-plane is coded as prescribed by procedure 1000. Operation then proceeds to decision step 1314.

In decision step 1314, a determination is made as to whether any bit-planes remain to be coded. Coding may continue until the rightmost bit-plane has been coded or, at the user's option, be terminated before all bit-planes have been coded. If any bit-planes remain to be coded, operation proceeds to step 1306. Otherwise, operation proceeds to the end 1316 of the procedure.

Thus, the processing in subroutine 1300 will continue until all coding passes are completed for all bit-plane to be coded of the current code-block.

An exemplary method of performing significance-propagation processing in accordance with the method of present invention will now be discussed with reference to FIG. 9 which comprises the combination of FIGS. 9A and 9B. The significance-propagation pass encoding subroutine 900 shown in FIG. 9 is called from the main encoding routine 1300 in step 1308. Accordingly, by the time subroutine 900 is called, all coding passes for previous bit-planes will have been completed.

The subroutine 900 starts in step 902. At this point, the neighborhood descriptor table 300, for the set of wavelet coefficients being processed has already been updated by the processing performed in the previous coding passes. Thus, the neighborhood descriptor value corresponding to each wavelet coefficient, is available from the start of processing performed by subroutine 900. From start step 902, where the subroutine begins being executed, operation proceeds to step 904 wherein the wavelet coefficient to be processed is initialized to the value of the first bit of the wavelet coefficient corresponding to location (0,0). Thus, in step 904, processing is initialized to start from the current bit plane of the first wavelet coefficient of the block of wavelet coefficients being processed.

Operation proceeds from set 904 to decision step 910. In decision step 910, a determination is made as to whether or not the neighborhood descriptor value corresponding to the bit value being processed lies between 1 and 47, inclusive. If the neighborhood descriptor value corresponding to the bit value being processed is 0, 48, 49, or 50, then operation proceeds to step 944 via connecting node 908. However, if the neighborhood descriptor value corresponding to the bit value being processed lies between 1 and 47, then operation proceeds from step 910 to step 922.

In step 912, the neighborhood descriptor value corresponding to the coefficient being coded, obtained from the neighborhood descriptor table, is used in a context state look-up operation. The neighborhood descriptor value is used as an index into a table which relates neighborhood descriptor values to encoding context state values to be used for coding. Thus, a lookup table entry corresponding to the neighborhood descriptor value of the coefficient being processed is accessed and a context state 914 included in the entry is determined to be the context state to be used for coding. The determined context state 914 is then supplied to coding step 916. In step 916, the bit value being processed is coded using the MQ encoder 102 using the determined context state 914 as an encoder control value. The MQ encoding operation performed in step 916 results in one or more internal encoder parameters being updated and/or one or more accumulated values being modified. Over time, one or more resulting coded values are produced by the MQ encoder as coding step 916 is repeated as different coefficients are coded. The resulting coded values produced by step 916 are stored in memory to produce as set of coded values representing the same image or image portion as the block of coefficients subject to the coding process. The coded values are stored, transmitted, or stored for later transmission, e.g., in the system's memory, and the transmitted. In some embodiments the coded values are transmitted immediately without being stored.

Operation proceeds from step 916 to step 918. In step 918, a determination is made as to whether or not the bit value that was just subjected to coding is a 1. If the bit value that was subject to encoding is not a 1, i.e., is 0, indicating that the context sign state does not need to be encoded, operation proceeds to step 944 via connecting node 922. However, if in step 918 it is determined that the bit value that was encoded is 1, operation proceeds to step 926 via connecting node 920.

In step 926 a state information lookup operation is performed to determine from state information lookup table, e.g., table 2100 of FIG. 21, the default sign value corresponding to the current neighborhood descriptor value of the coefficient being processed. Next, in step 930, another state information lookup operation is performed to determine from the state information lookup table the context sign state to be used to encode the determined default sign value. Steps 926 and 930 may be combined into a single look-up operation which retrieves both values but is shown as two separate operations for purposes of explaining the invention.

Operation proceeds from step 930 to encoding step 934 which receives as inputs the default sign value 928 and context sign state 932 determined in steps 926 and 930, respectively. In encoding step 934, the MQ encoder 102 is used to encode the difference between the sign value for the coefficient being processed and the determined default sign value using the determined context sign state as a control value. The MQ encoding operation performed in step 934, line the operation performed in step 916 results in one or more internal encoder parameters being updated and/or one or more accumulated values being modified. Over time, one or more resulting coded values are produced by the MQ encoder as coding step 936 is repeated and different coefficients are coded. The resulting coded values produced by step 936 are stored in memory along with the resulting coded values produced in step 916 as part of the generated set of coded values which are stored and/or transmitted.

Following completion of the encoding operation in step 934, the neighborhood descriptor values stored in the neighborhood descriptor state table 300 are updated for the current coefficient being processed and the adjoining coefficient neighbors in step 936. The new coefficient state values for the coefficients being updated are determined from state information table 1300 as a function of the current updated state of the coefficient corresponding to the bit value being processed and the position of the individual coefficient being updated relative to the current coefficient whose bit value is being processed. The neighborhood descriptor value for the current coefficient being processed is updated to value 48 if the current value is 0, or updated to value 49 otherwise.

Once the neighborhood descriptor value of the coefficient corresponding to the bit value being processed and the immediately adjacent neighbor coefficients are updated in step 936 operation proceeds to exit determination step 944. In step 944 a check is made to determine if a bit value corresponding to each of the coefficients in the block of wavelet coefficients has been processed. If the answer is yes, significance-propagation pass processing for the bit plane being processed has been completed and operation returns to the main routine to the point where subroutine 900 was called.

If, however, in step 944 it is determined that processing of the bit plane has not been completed operation proceeds to step 940. In step 940 the next wavelet coefficient to be processed is determined according to JPEG 2000's prescribed scanning pattern. Operation proceeds from step 940 to step 910 via connecting node C 942.

Thus, the processing in subroutine 900 will continue until the significance-propagation pass is completed for the bit plane being processed and processing returns to the main encoding routine via return step 946.

An exemplary method of performing magnitude-refinement processing in accordance with the method of present invention will now be discussed with reference to FIG. 10. The magnitude-refinement pass encoding subroutine 1000 shown in FIG. 10 is called from the main encoding routine 1300 in step 1310. Accordingly, by the time subroutine 1000 is called, the significant-propagation pass discussed with regard to FIG. 9 will have been completed.

The subroutine 1000 starts in step 1002. At this point, the neighborhood descriptor state table 300, for the set of wavelet coefficients being processed has already been updated by the processing performed in the previous coding passes. Thus, the neighborhood descriptor value corresponding to each wavelet coefficient, is available from the start of processing performed by subroutine 1000. From start step 1002, where the subroutine begins being executed, operation proceeds to step 1004 wherein the wavelet coefficient to be processed is initialized to the value of the first bit of the wavelet coefficient corresponding to location (0,0). Thus, in step 1004, processing is initialized to start from the current bit plane of the first wavelet coefficient of the block of wavelet coefficients being processed.

Operation proceeds from set 1004 to decision step 1006. In decision step 1006, a determination is made as to whether or not the neighborhood descriptor value corresponding to the bit value being processed exceeds 47. If the neighborhood descriptor value corresponding to the bit value being processed does not exceed 47, then operation proceeds to step 1016. However, if the neighborhood descriptor value corresponding to the bit value being processed does exceed 47, then operation proceeds from step 1006 to step 1008.

In step 1008, a neighborhood descriptor information table look-up operation is performed to determine the current context state to be used for encoding the bit value being processed. This involves using the neighborhood descriptor value of the coefficient being processed, available from neighborhood coefficient descriptor state table 300, to retrieve the applicable context state to be used for coding from an information table such as the table 2100. Thus, the information entry corresponding to the neighborhood descriptor value of the coefficient being processed is accessed in step 1008 as part of a look-up table operation and the context state value 1010 to be used is retrieved from the table. The determined context state 1010 is then supplied to encoding step 1012. In step 1012, the bit value being processed is encoded using the MQ encoder 102 using the determined context state 1010 as an encoder control value.

As with the previously described MQ encoding steps, step 1012 involves performing a standard MQ encoding operation which will result in internal encoder values being updated and possibly resulting in a resulting coded value being produced which can be stored and/or transmitted.

Following completion of the encoding operation in step 1012, the neighborhood descriptor values stored in the neighborhood descriptor state table 300 are updated in step 1014. The neighborhood descriptor value which was just coded is updated. In the case of the FIG. 21 embodiment this is to a fixed value, 48, to which each coefficient that is coded is updated. The adjoining coefficient neighbor's neighborhood state descriptor values are updated in step 1014 to values indicated in a state information lookup table using the neighborhood state descriptor value of the coefficient that was coded, prior to the update in step 1014, in conjunction with position information, and information on whether the coded coefficient was positive or negative to determine the new neighborhood state descriptor value for the neighboring coefficient which is having its value updated. Thus, in accordance with the present invention, the new coefficient state values for the adjoining coefficients that are being updated are determined from a state information look-up table operation, e.g., an operation which accesses and retrieves the new neighborhood state values from table 2100.

Once the neighborhood descriptor value of the coefficient corresponding to the bit value being processed and the immediately adjacent neighbor coefficients are updated in step 1014 operation proceeds to exit determination step 1018. In step 1018 a check is made to determine if a bit value corresponding to each of the coefficients in the block of wavelet coefficients has been processed. If the answer is yes, magnitude-refinement processing for the bit plane being processed has been completed and operation returns to the main routine to the point where subroutine 1000 was called.

If, however, in step 1018 it is determined that processing of the bit plane has not been completed operation proceeds to step 1016. In step 1016 the next wavelet coefficient to be processed is determined according to JPEG 2000's prescribed scanning pattern. Operation proceeds from step 1018 to step 1006.

Thus, the processing in subroutine 1000 will continue until the magnitude-refinement pass is completed for the bit plane being processed and processing returns to the main encoding routine via return step 1020.

Figure 11A:
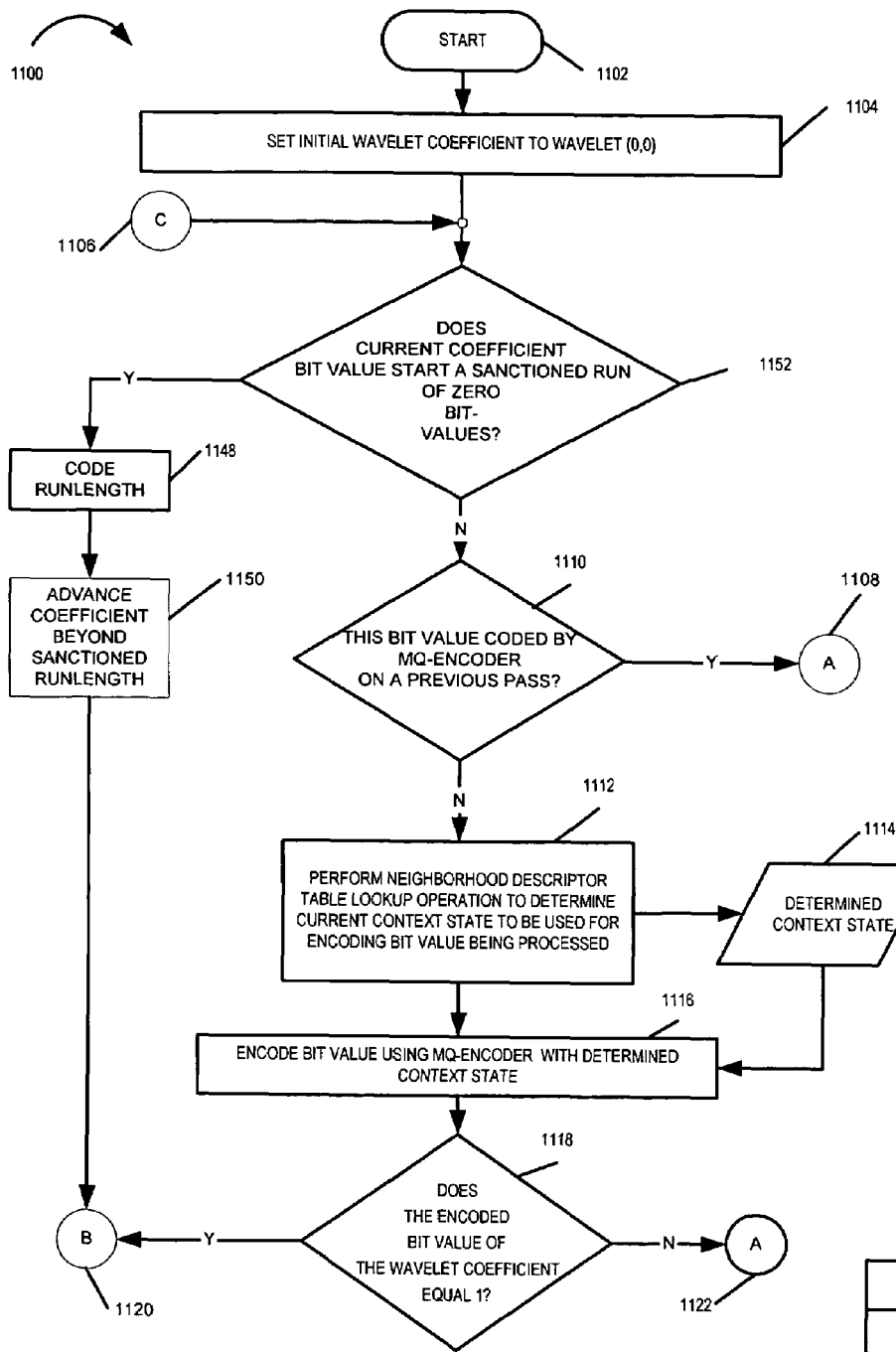
FIGS. 11A and 11B illustrate the steps of clean-up pass subroutine implemented in accordance with the present invention.
Figure 11B:
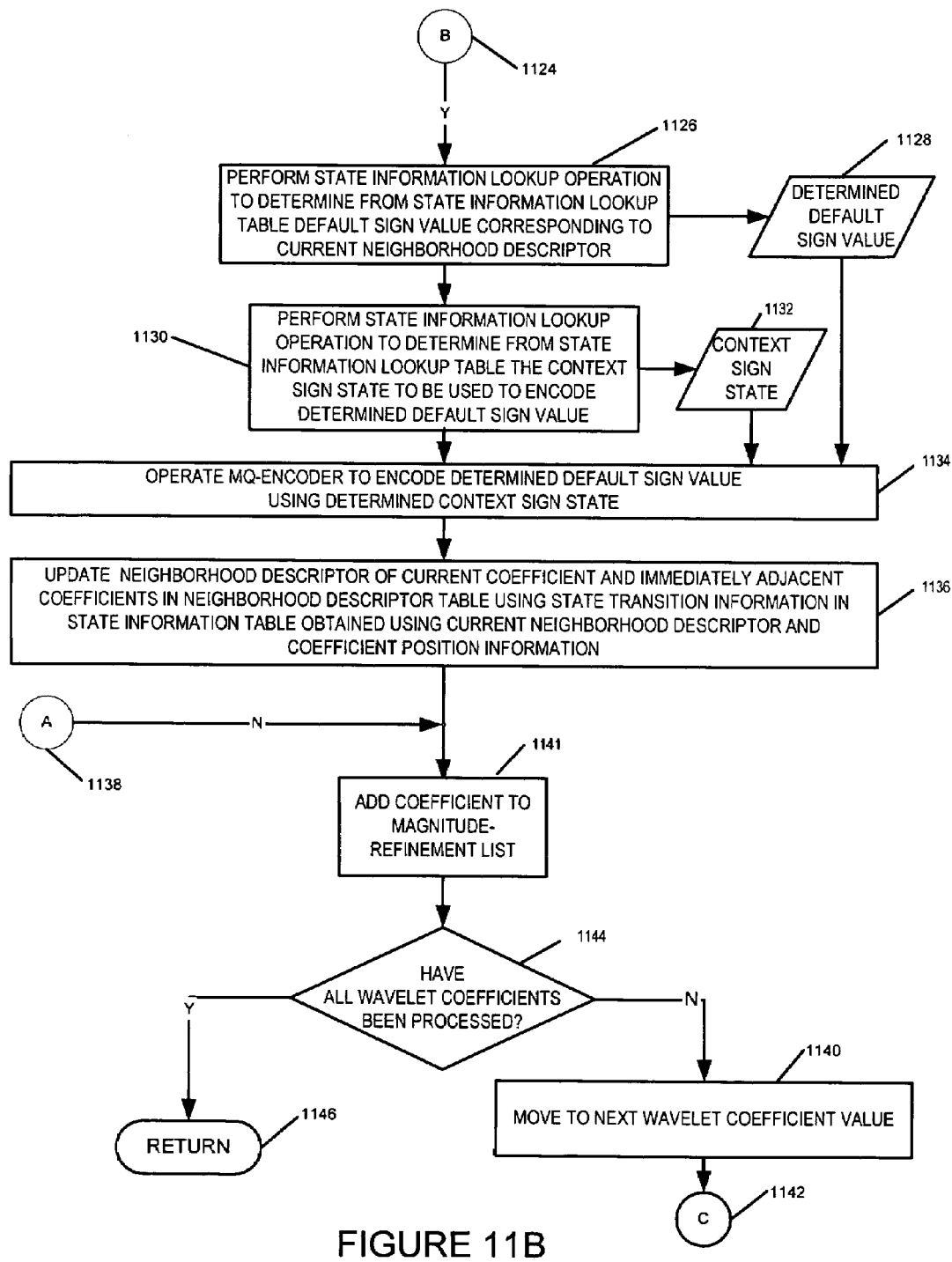

An exemplary method of performing clean-up pass processing in accordance with the method of present invention will now be discussed with reference to FIG. 11 which comprises the combination of FIGS. 11A and 11B. The cleanup pass encoding subroutine 1100 shown in FIG. 11 is called from the main encoding routine 1300 in step 1312. Accordingly, by the time subroutine 1100 is called, the significant propagation pass discussed with regard to FIG. 9 and the magnitude refinement pass discussed with regard to FIG. 10, will have been completed.

The subroutine 1100 starts in step 1102. At this point, the neighborhood descriptor table 300, for the set of wavelet coefficients being processed has already been updated by the processing performed in the previous coding passes. Thus, the neighborhood descriptor value corresponding to each wavelet coefficient, is available from the start of processing performed by subroutine 1100. From start step 1102, where the subroutine begins being executed, operation proceeds to step 1104 wherein wavelet coefficient to be processed is initialized to the value of the first bit of the wavelet coefficient corresponding to location (0,0). Thus, in step 1104, processing is initialized to start from the current bit plane of the first wavelet coefficient of the block of wavelet coefficients being processed.

Operation proceeds from set 1104 to decision step 1152. In decision step 1152, a check is made for a sanctioned runlength of zeros and processing is moved to the next wavelet coefficient value. The next wavelet coefficient value to be processed will be the coefficient corresponding to the next location according to JPEG 2000's prescribed scanning pattern in the block of coefficients being coded if a sanctioned runlength was not encountered and the first coefficient following the run of zeros in the case when a sanctioned runlength is encountered. Sanctioned runlengths of zeros are runs of a specific number of zeros in the bitplane being encoded which JPEG 2000 requires be encoded using run length encoding. Since JPEG 2000 specifies what runlengths are to be coded using run length coding this application will not go into any further detail about such run lengths. However, is should be noted that the example which has been selected to illustrate application of the present invention has been selected to be a 3×3 block of wavelet coefficient values so that sanctioned JPEG runlengths will not be encountered during the example.

In decision step 1152 a determination is made whether the current coefficient is the start of a sanctioned runlength if zeros. If this current coefficient is the start of such a runlength, operation proceeds to step 1148. Otherwise, operation proceeds to decision step 1110.

In step 1148 the runlength is coded according to the method prescribed by the JPEG 2000 specification. This effectively describes the current bit-plane value as zero for all coefficients belonging to the given sanctioned runlength. Operation then proceeds to step 1150.

In step 1150, the coefficient is advanced to the first position beyond the given sanctioned runlength. Operation then proceeds to step 1126 via connecting node B 1120.

In decision step 1110, a determination is made as to whether or not the bit value being processed was coded by the MQ encoder 102 on a previous pass. If the coefficient bit value being processed was coded by the MQ encoder 102 on a previous pass, operation proceeds to step 1141 via connecting node A 1108. However, if the bit value being processed was not coded by the MQ encoder 102 on a previous pass, operation proceeds from step 1110 to step 1112.

In step 1112, a neighborhood descriptor table information look-up operation is performed to determine the current context state to be used for encoding the bit value being processed. As part of the information lookup operation, the neighborhood descriptor value corresponding the coefficient being coded, e.g., as indicated by neighborhood value state table 300, is used to identify an information entry in the information table being accessed, e.g., table 2100 and to retrieve from the accessed the context state value to be used to code the bit value being processed. The determined context state 1114 is then supplied to encoding step 1116. In step 1116, the bit value being processed is encoded using the MQ encoder 102 using the determined context state 1114 as an encoder control value. As in the other MQ coding operation states, this will result in the updating of one or more internal encoder parameters and may result in the generation of a resulting coded value which may be stored and/or transmitted.

In step 1118, a determination is made as to whether or not the just-encoded bit value is a 1. If the just encoded bit value is not a 1, i.e., is 0, indicating that the context sign state does not need to be encoded, operation proceeds to step 1141 via connecting node A 1122. However, if in step 1118 it is determined that the encoded bit value is 1, operation proceeds to step 1126 via connecting node B 1120.

In step 1126 another state information lookup operation is performed to determine from state information lookup table, e.g., table 2100, the default sign value corresponding to the neighborhood descriptor value of the coefficient which had a bit that was just coded. Next, in step 1130, an additional state information lookup operation is performed to determine from the state information lookup table the context sign state to be used to encode the determined default sign value. Steps 1126 and 1130 may be combined into a single look-up operation which retrieves both values but is shown as two separate operations for purposes of explaining the invention.

Operation proceeds from step 1130 to encoding step 1134 which receives as inputs, the default sign value 1128 and context sign state 1132 determined in steps 1126 and 1130, respectively. In encoding step 1134, the MQ encoder 102 is used to encode the difference between the sign value for the coefficient being processed and the determined default sign value using the determined context sign state as a control value. As with the other MQ encoder operations, this results in one or more encoding parameter's being updated and may result in a resulting coded value being produced.

Following completion of the encoding operation in step 1134, the neighborhood descriptor values stored in the neighborhood descriptor information table 300 are updated for the current coefficient being processed and the adjoining coefficient neighbors in step 1136. The new coefficient state values for the neighboring coefficients being updated are determined from state information table 2100 as a function of the current updated state of the coefficient corresponding to the bit value being processed and the position of the individual coefficient being updated relative to the current coefficient whose bit value is being processed. In the exemplary embodiment which uses the information table of FIG. 21, the neighborhood descriptor for the current coefficient being processed is updated to value 48 if the current value is 0, or updated to value 49 otherwise.

Once the neighborhood descriptor of the coefficient corresponding to the bit value being processed and the immediately adjacent neighbor coefficients are updated in step 1136 operation proceeds to step 1141.

In step 1141 the given coefficient is added to a list of coefficients to be processed is the following magnitude-refinement pass. Execution then proceeds to exit determination step 1144. This list will be used to facilitate magnitude refinement pass processing by allowing the processing to be limited to the coefficients included on the generated list.

In step 1144 a check is made to determine if a bit value corresponding to each of the coefficients in the block of wavelet coefficients has been processed. If the answer is yes, clean up pass processing for the bit plane being processed has been completed and operation returns to the main routine to the point where subroutine 1100 was called.

If, however, in step 1144 it is determined that processing of the bit plane has not been completed operation proceeds to step 1140. In step 1140 the next wavelet coefficient to be processed is determined according to JPEG 2000's prescribed scanning pattern. Operation proceeds from step 1140 to step 1152 via connecting node C 1142.

Thus, the processing in subroutine 1100 will continue until the clean up pass is completed for the bit plane being processed and processing returns to the main encoding routine via return step 1146.

An alternate exemplary method of performing magnitude-refinement processing in accordance with the method of present invention will now be discussed with reference to FIG. 12. The example of FIG. 12 takes advantage and uses a list of coefficients to be processed which was generated in a previous coding pass in accordance with the invention. In one embodiment, the list includes a value indicating the total number of coefficients in the list. The FIG. 12 embodiment updates, e.g., decrements a counter, initially set in start step 1202 to the number of coefficients in the list of coefficients to be processed, after each coefficient is processed. In this manner, the method of FIG. 12 can easily determine from the count when all the coefficients on the list have been processed.

Figure 12:
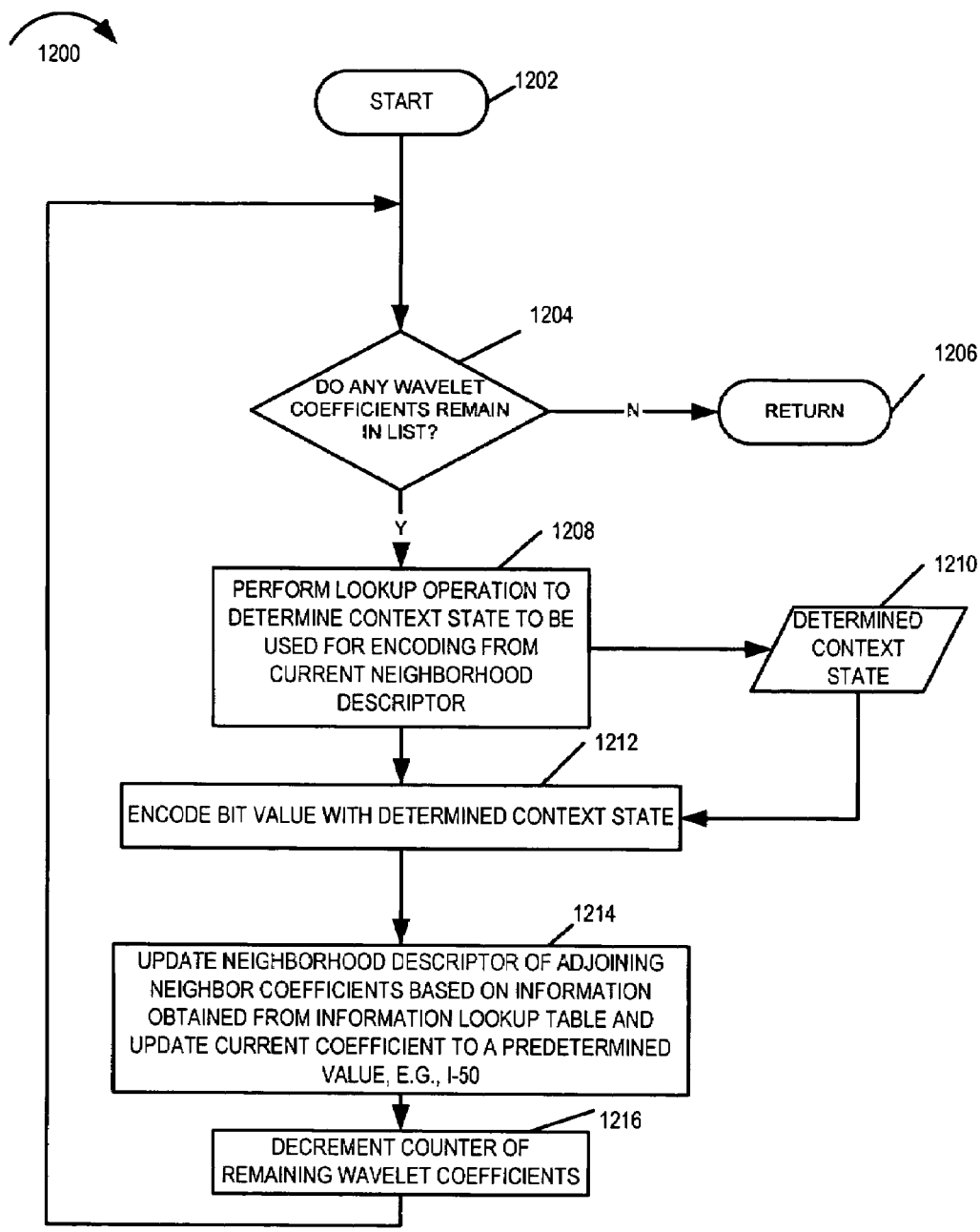
FIG. 12 illustrates the steps of an alternate magnitude-refinement pass processing subroutine which uses a precompiled list of coefficients, implemented in accordance with the present invention.

The magnitude-refinement pass encoding subroutine 1200 shown in FIG. 12 is called from the main encoding routine 1300 in step 1310. Accordingly, by the time subroutine 1200 is called, the significant-propagation pass discussed with regard to FIG. 9 will have been completed.

The subroutine 1200 starts in step 1202. At this point, the neighborhood descriptor table 300, for the set of wavelet coefficients being processed has already been updated by the processing performed in the previous coding passes. Thus, the neighborhood descriptor value corresponding to each wavelet coefficient, is available from the start of processing performed by subroutine 1200. Moreover, a list of wavelet coefficients to be processed in the magnitude-refinement pass has been constructed in step 1141 of the most recent clean-up pass. As noted above, the counter of coefficients is set in step 1202 to the number of coefficients in the list to be processed.

From start step 1202, where the subroutine begins being executed, operation proceeds to step 1204 wherein the number of wavelet coefficient remaining to be processed is examined to see whether any coefficients yet need to be processed. If no coefficients remain to be processed, execution returns to the main routine to the point where subroutine 1200 was called.

If it is determined in step 1204 that wavelet coefficients remain to be processed, execution proceeds to step 1208. In step 1208, a neighborhood descriptor information table look-up operation is performed to determine the current context state to be used for encoding the bit value being processed. Thus, the neighborhood descriptor value obtained from neighborhood descriptor state table 300 for the coefficient being processed, is used as an index into the information table, e.g., table 2100, and the corresponding context state value is determined from the accessed entry. The determined context state 1212 is then supplied to encoding step 1212. In step 1212, the bit value being processed is encoded using the MQ encoder 102 using the determined context state 1210 as an encoder control value.

Following completion of the encoding operation in step 1212, where the bit value being processed is encoded using known MQ encoding techniques and the determined context state, the neighborhood descriptor values stored in the neighborhood descriptor information table 300 are updated for the current coefficient being processed and the adjoining coefficient neighbors. This update of neighborhood state descriptor values occurs in step 1214. The new descriptor values for the neighboring coefficients being updated are determined from state information table, e.g., table 2100, as a function of the descriptor value of the coefficient which is being processed prior to updating in step 1214. In addition, the neighborhood state descriptor value of the coefficient which was just processed is updated to a predetermined fixed state value, e.g., 50.

Once the neighborhood descriptor of the coefficient corresponding to the bit value being processed and the immediately adjacent neighbor coefficients are updated in step 1214 operation proceeds to exit determination step 1216. In step 1216 the stored number of wavelet coefficients remaining to be processed is decremented to reflect the coefficient just processed. Execution then proceeds to the decision step 1204.

Thus, the processing in subroutine 1200 will continue until the magnitude-refinement pass is completed for the bit plane being processed and processing returns to the main encoding routine via return step 1206. At the end of the magnitude-refinement pass, each coefficient on the list to be processed will have had its neighborhood state descriptor value in FIG. 3 updated to a predetermined descriptor value, e.g., 50.

Figure 15:
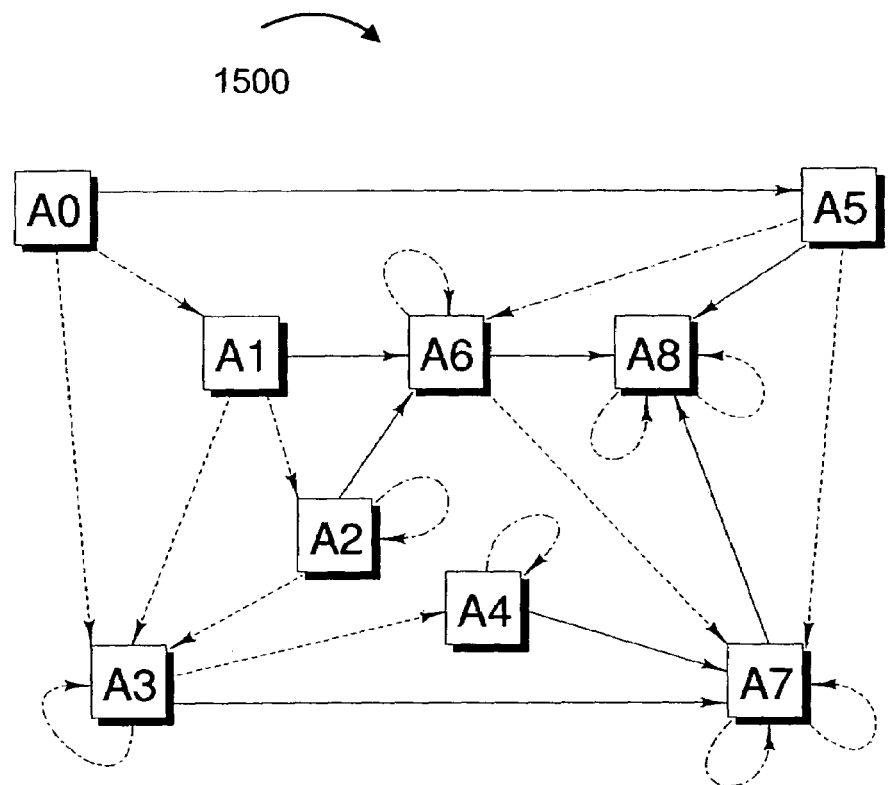
FIG. 15 illustrates states and transitions between them, for coding significance bits of LH, HL, or LL wavelet coefficients in accordance with the invention.
Figure 18:
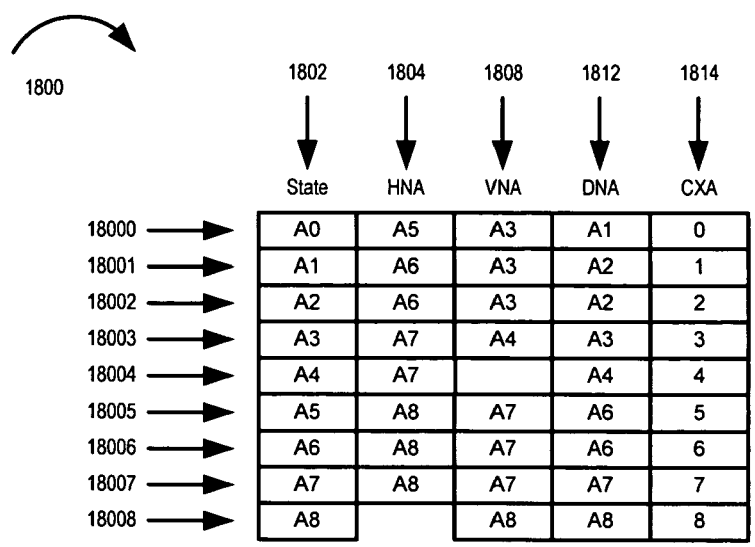
FIG. 18 illustrates an exemplary state machine in the form of an information look-up table for coding significance bits of LH, HL, or LL wavelet coefficients.

FIG. 18 illustrates the contents of an exemplary set of information look-up tables embodying State machine A shown conceptually in FIG. 15, and useable for coding the significance bits of LL, LH, or HH wavelet coefficients. The leftmost column 1802 shows the input index values, e.g., neighborhood descriptor values to be used as an index to the table, labeled A0-A8. Such a neighborhood descriptor value is stored corresponding to each wavelet coefficient in the table 300 of neighborhood descriptor values. Any numerical values could be chosen to correspond to the labels A0-A8; in particular, A0 could be assigned the value 0, A1 assigned the value 1, etc. Each row 18000-18008 shows the look-up table contents corresponding to a single input index (neighborhood descriptor) value. The column HNA 1804 gives the new index value corresponding to a wavelet coefficient when one of its horizontal neighbors becomes significant, i.e., blossoms. The column VNA 1808 gives the new index value corresponding to a wavelet coefficient when one of its vertical neighbors blossoms. The column DNA 1812 gives the new index value corresponding to a wavelet coefficient when one of its diagonal neighbors blossoms. The column CXA 1814 gives the MQ-coder context value to be used in coding a significance bit for a wavelet coefficient with the given index value.

Figure 16:
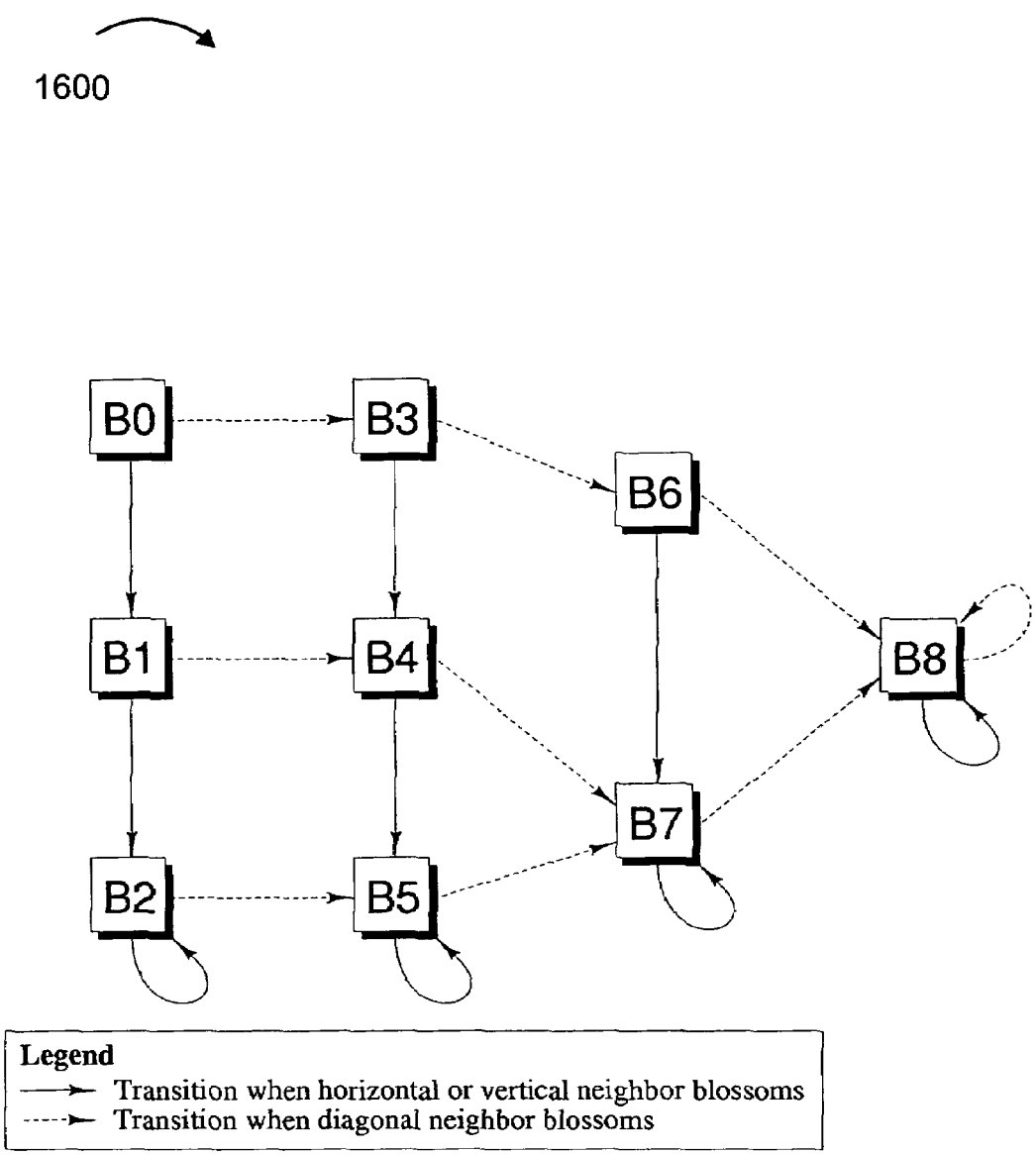
FIG. 16 illustrates states and transitions between them, for coding significance bits of HH wavelet coefficients in accordance with the invention.
Figure 19:
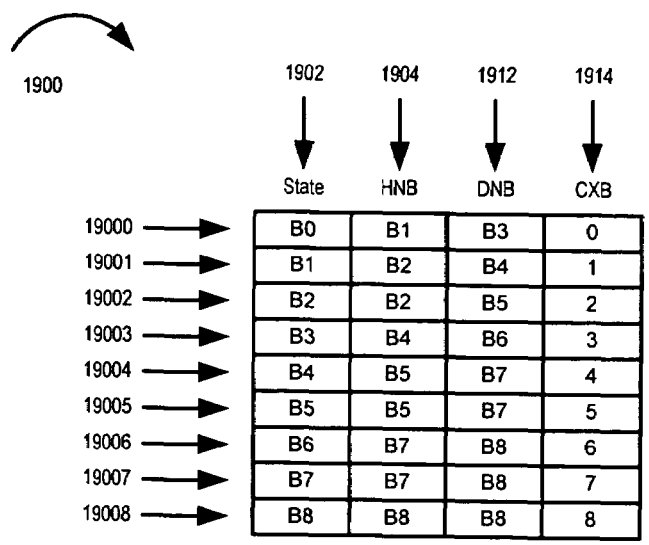
FIG. 19 illustrates an exemplary state machine in the form of an information look-up table for coding significance bits of HH wavelet coefficients.

FIG. 19 illustrates the contents of an exemplary set of information look-up tables embodying State machine B shown conceptually in FIG. 16, and useable for coding the significance bits of HH wavelet coefficients. The leftmost column 1902 shows the input index values, i.e., neighborhood descriptor values, corresponding to the entries in the corresponding row. In this embodiment, the utilized neighborhood state descriptor values are labeled B0-B8. Such an descriptor value may be stored corresponding to each wavelet coefficient in the table of neighborhood descriptor values. Any numerical values could be chosen to correspond to the labels B0-B8 ; in particular, B0 could be assigned the value 0, B1 assigned the value 1, etc. Each row 19000-19008 shows look-up table contents corresponding to a single input index value. The column HNB 1904 gives the new index value corresponding to a wavelet coefficient when one of its horizontal neighbors blossoms. The column VNB 1908 gives the new index value corresponding to a wavelet coefficient when one of its vertical neighbors blossoms. The column DNB 1912 gives the new index value corresponding to a wavelet coefficient when one of its diagonal neighbors blossoms. The column CXB 1914 gives the MQ-coder context value to be used in coding a significance bit for a wavelet coefficient with the given index value.

Figure 17:
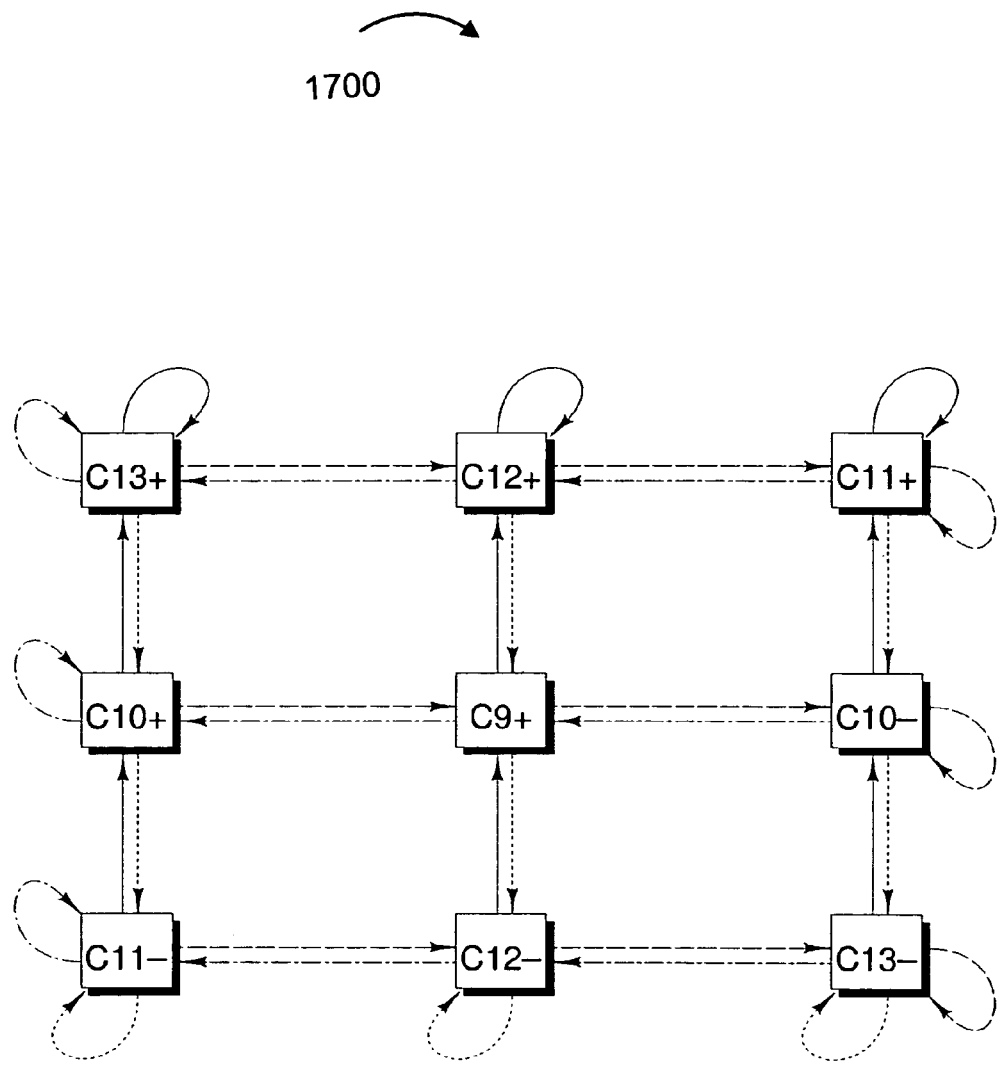
FIG. 17 illustrates states and transitions between them, for coding sign bits of wavelet coefficients in accordance with the present invention.
Figure 20:
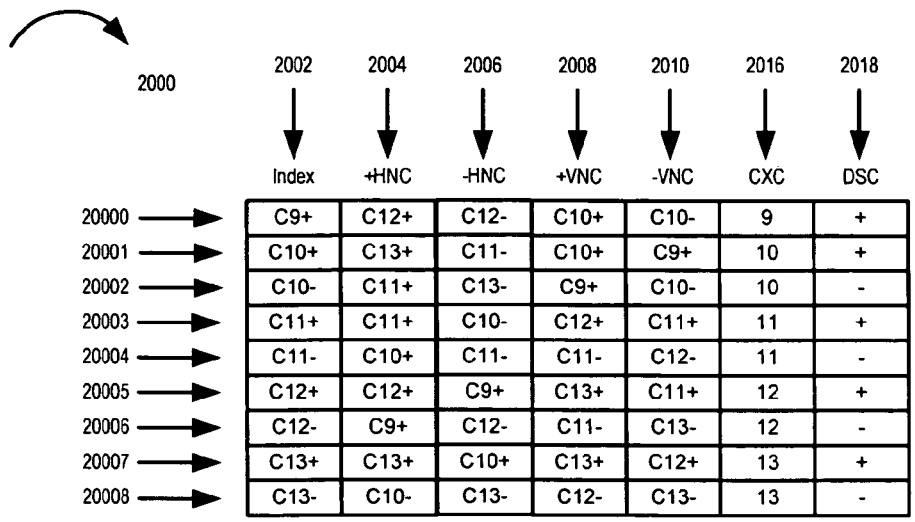
FIG. 20 illustrates an exemplary state machine in the form of an information lookup table for coding sign bits of wavelet coefficients.

FIG. 20 illustrates the contents of an exemplary information look-up table embodying State machine C shown conceptually in FIG. 17, and useable for coding the sign bits of LL, LH, HL, or HH wavelet coefficients. The leftmost column 2002 shows the input index values (state descriptor values) corresponding to the elements in the columns to the right of the index value. The index values are labeled C9+, C10+, C10−, C11+, C11−, C12+, C12−, C13+, and C13−. Such an index value may be stored corresponding to each wavelet coefficient in the table of neighborhood descriptor values 300. Any set of different numerical values could be chosen to correspond to the labels C9+−C13−, respectively. Each row 20000-20008 shows look-up table contents corresponding to a single input index value. The column +HNC 2004 gives the new index value corresponding to a wavelet coefficient when one of its horizontal neighbors blossoms and takes a positive value. The column −HNC 2006 gives the new index value corresponding to a wavelet coefficient when one of its horizontal neighbors blossoms and takes a negative value. The column +VNC 2008 gives the new index value corresponding to a wavelet coefficient when one of its vertical neighbors blossoms and takes a positive value. The column −VNC 2010 gives the new index value corresponding to a wavelet coefficient when one of its vertical neighbors blossoms and takes a negative value. The column CXC 2016 gives the MQ-coder context value to be used in coding a sign bit for a wavelet coefficient with the given index value. The column DSC 2018 gives the default sign value to be used in coding a sign bit for a wavelet coefficient with the given index value.

FIG. 21 illustrates the contents of an exemplary set of information look-up tables embodying State machine D combining the functionality of State machine A shown conceptually in FIG. 15, and State machine C shown conceptually in FIG. 17, and useable for coding both the significance bits and the sign bits of LL or LH wavelet coefficients. The leftmost column 2102 shows the input index values to the tables, e.g., neighborhood state descriptor values, labeled D0-D26 and D48-D50. In various embodiments, as discussed above, one neighborhood state descriptor value which can be used as an index into table 2100 is stored for each wavelet coefficient to be processed in a table of neighborhood descriptor values, e.g., table 300. Any numerical values could be chosen to correspond to the labels D0-D26 and D48-D50 so long as different values were used for each label; in particular, D0 could be assigned the value 0, D1 assigned the value 1, etc. Each row 21000-21050 shows information entries corresponding to a single input index value, i.e., neighborhood state descriptor value. The column +HND 2104 gives the new index value corresponding to a wavelet coefficient when one of its horizontal neighbors blossoms and takes a positive value. The column −HND 2106 gives the new index value corresponding to a wavelet coefficient when one of its horizontal neighbors blossoms and takes a negative value. The column +VND 2108 gives the new index value corresponding to a wavelet coefficient when one of its vertical neighbors blossoms and takes a positive value. The column −VND 2110 gives the new index value corresponding to a wavelet coefficient when one of its vertical neighbors blossoms and takes a negative value. The column DND 2112 gives the new index value corresponding to a wavelet coefficient when one of its diagonal neighbors blossoms. The column CXD1 2114 gives the MQ-coder context value to be used in coding a significance bit for a wavelet coefficient with the given index value. The column CXD2 2116 gives the MQ-coder context value to be used in coding a sign bit for a wavelet coefficient with the given index value. The column DSD 2118 gives the default sign value to be used in coding a sign bit for a wavelet coefficient with the given index value.

Figure 22:
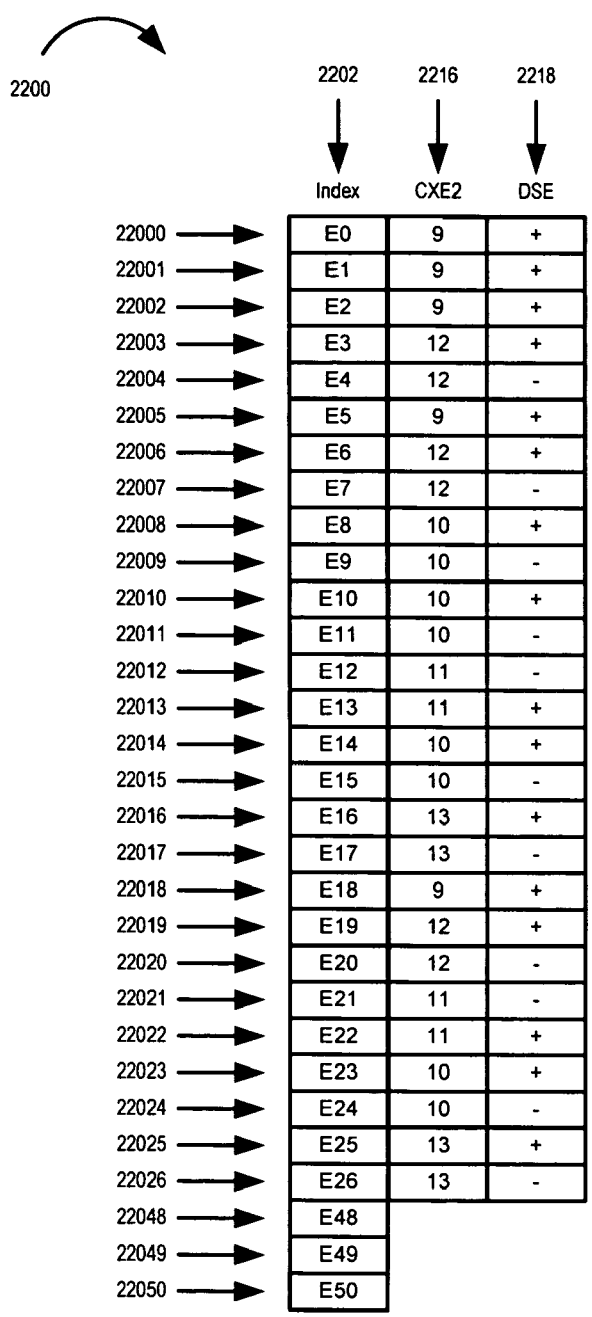
FIG. 22 illustrates an exemplary state machine in the form of an information look-up table for HL wavelet coefficients.

FIG. 22 illustrates the contents of an another exemplary information look-up table which includes entries for +HND, −HND, +VND, −VND, DND, and CXD1. Table 22 embodies State machine E combining the functionality of State machine A shown conceptually in FIG. 15 and State machine C shown conceptually in FIG. 17, and useable for coding both the significance bits and the sign bits of HL wavelet coefficients. The leftmost column 2202 shows the input index values to the tables, labeled E0-E26 and E48-E50. Such an index value is stored corresponding to each wavelet coefficient in the table of neighborhood descriptor values.

Any numerical values could be chosen to correspond to the labels E0-E26 and E48-E50 as long as different values are used for each index; in particular, E0 could be assigned the value 0, E1 assigned the value 1, etc. Each row 22000-22050 shows look-up table entries corresponding to a single input index value. The column CXE2 2216 gives the MQ-coder context value to be used in coding a sign bit for a wavelet coefficient with the given index value. The column DSE 2218 gives the default sign value to be used in coding a sign bit for a wavelet coefficient with the given index value.

Figure 23A:
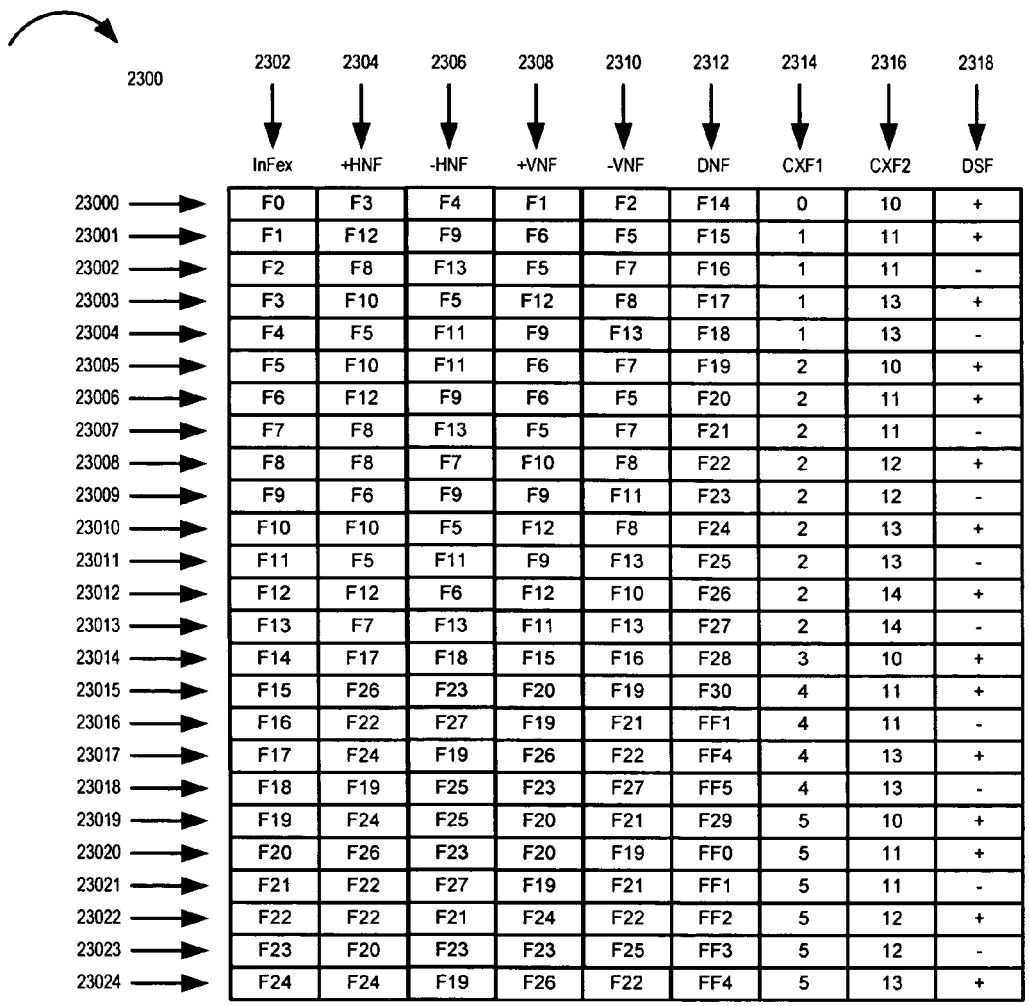

FIG. 23 illustrates the contents of another exemplary information look-up table embodying State machine F combining the functionality of State machine B shown conceptually in FIG. 16 and State machine C shown conceptually in FIG. 17, and useable for coding both the significance bits and the sign bits of HH wavelet coefficients. The leftmost column 2302 shows the input index values to the table entries to the right of each index, labeled F0-F46 and F48-F50. Such an index value is stored corresponding to each wavelet coefficient in the table of neighborhood descriptor values. Any numerical values could be chosen to correspond to the labels F0-F46 and F48-F50 so long as different values are used for each index; in particular, F0 could be assigned the value 0, F1 assigned the value 1, etc. Each row 23000-23050 shows look-up table entries corresponding to a single input index value. The column +HNF 2304 gives the new index value corresponding to a wavelet coefficient when one of its horizontal neighbors blossoms and takes a positive value. The column –HNF 2306 gives the new index value corresponding to a wavelet coefficient when one of its horizontal neighbors blossoms and takes a negative value. The column +VNF 2308 gives the new index value corresponding to a wavelet coefficient when one of its vertical neighbors blossoms and takes a positive value. The column –VNF 2310 gives the new index value corresponding to a wavelet coefficient when one of its vertical neighbors blossoms and takes a negative value. The column DNF 2312 gives the new index value corresponding to a wavelet coefficient when one of its diagonal neighbors blossoms. The column CXF1 2314 gives the MQ-coder context value to be used in coding a significance bit for a wavelet coefficient with the given index value. The column CXF2 2316 gives the MQ-coder context value to be used in coding a sign bit for a wavelet coefficient with the given index value. The column DSF 2318 gives the default sign value to be used in coding a sign bit for a wavelet coefficient with the given index value.

While FIGS. 18, 19, 20, 21, 22, and 23 show separate state information tables which can be used to implement look-up-table-based state machines in accordance with the present invention, it is to be understood that some or all of the state information tables could be combined into a single state information table which is used to implement the state machine operations in accordance with the present invention.

Figure 24:
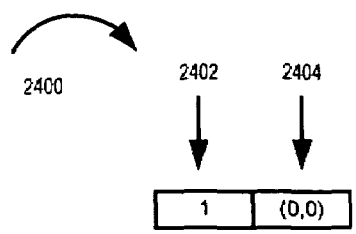
FIGS. 24-27 illustrate various exemplary coefficient processing lists generated in accordance with various embodiments of the present invention while processing the exemplary coefficient block of FIG. 2.

FIG. 24 illustrates a list 2400 of coefficients to be processed in the magnitude-refinement coding pass as generated by step 1141 of procedure 1100 and used as input to the alternative coding routine shown in FIG. 12. This list is generated from the exemplary set of wavelet coefficient values shown in FIG. 2, as the clean-up pass operates on the first bit-plane 204, 216, 228 with input neighborhood-descriptor values shown in FIG. 4. The list 2400 includes a total number of coefficient values 2402 which indicates the total number of coefficients to be processed in the magnitude refinement coding pass. The list 2400 also includes a set of coefficient identifiers which indicate the specific coefficients to be processed. In this example, the set 2404 identifies a single coefficient by coefficient column and row indices, e.g., (0,0), which identify the coefficient's location in the coefficient block being coded. Each coefficient position with a neighborhood-descriptor value greater than or equal to 48 has been added to the list 2404 of coefficients to be processed in the subsequent magnitude-refinement pass. The total number 2402 of coefficients in the magnitude-refinement list is 1.

Figure 25:
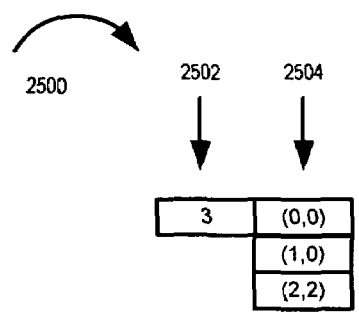

FIG. 25 illustrates a list 2500 of coefficients to be processed in the magnitude-refinement coding pass as generated by step 1141 of procedure 1100 and used as input to the alternative coding routine shown in FIG. 12. This exemplary list 2500 is generated from the exemplary set of wavelet coefficient values shown in FIG. 2, as the clean-up pass operates on the second bit-plane 206, 218, 230 with input neighborhood-descriptor values shown in FIG. 7. Each coefficient position with a neighborhood-descriptor value greater than or equal to 48 has been added to the set of coefficients 2504 to be processed in the subsequent magnitude-refinement pass. The total number 2502 of coefficients in the magnitude-refinement list is 3. The three identified coefficients are identified by row, column indices corresponding to the coefficient block being processed. In the example, the coefficients located at (0,0), (1,0), and (2,0) are to be processed in the subsequent magnitude refinement pass.

Figure 26:
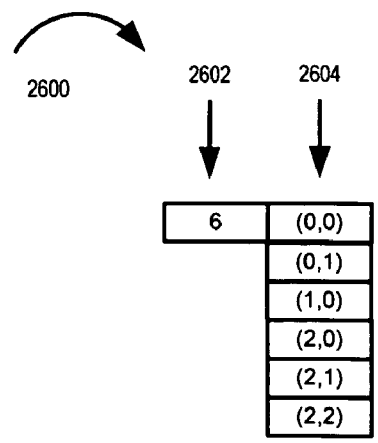

FIG. 26 illustrates a list 2600 of coefficients to be processed in the magnitude-refinement coding pass as generated by step 1141 of procedure 1100 and used as input to the alternative coding routine shown in FIG. 12. This list is generated from the exemplary set of wavelet coefficient values shown in FIG. 2, as the clean-up pass operates on the third bit-plane 208, 220, 232. Each coefficient position with a neighborhood-descriptor value greater than or equal to 48 has been added to the set 2604 of coefficients to be processed in the subsequent magnitude-refinement pass. The total number 2602 of coefficients in the magnitude-refinement list is 6. The set of coefficients to be processed in the magnitude refinement pass includes coefficients identified by column/row indices (0,0), (0,1), (2,0), (2,1) and (2,2).

Figure 27:
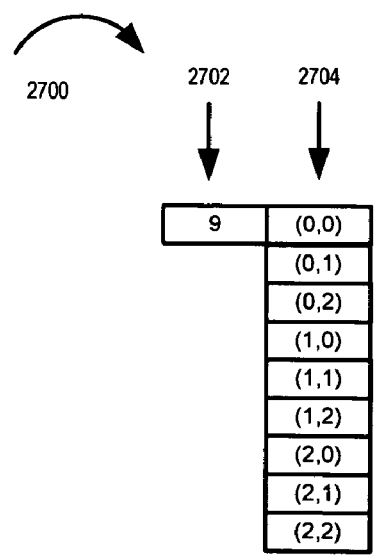

FIG. 27 illustrates a list 2700 of coefficients to be processed in the magnitude-refinement coding pass as generated by step 1141 of procedure 1100 and used as input to the alternative coding routine shown in FIG. 12. This list is generated from the exemplary set of wavelet coefficient values shown in FIG. 2, as the clean-up pass operates on the fourth bit-plane 210, 222, 234. Each coefficient position with a neighborhood-descriptor value greater than or equal to 48 has been added to the set 2704 of coefficients to be processed in the subsequent magnitude-refinement pass. The total number 2702 of coefficients in the magnitude-refinement list is 9.

Note that coefficients which are not to be processed in a particular coding pass to which a list 2400, 2500, 2600, 2700 corresponds, are omitted from the list. Thus, the omitted coefficients can be skipped with the processing of a particular pass being limited to the coefficients which are listed to be coded in the pass. Thus, in the embodiments of the present invention where a list of coefficients is generated and used, significant computation savings may be achieved since coefficients which are not to be processed in a particular pass can be skipped and no computations need to be made during the coding pass to determine which coefficients are to be processed since they are already identified in the list generated, in accordance with the invention, in one of the preceding coding passes.

While the use of the novel data coefficient state table of the present invention has been described above in regard to various flow charts and state tables, the methods and apparatus of the present invention can clearly be understood and appreciated in the context of an actual coding example. For purposes of explaining the invention, the exemplary coding example will be limited to performing JPEG 2000 compliant coefficient bit modeling on a 3×3 block of coefficients. However it should be appreciated that the methods and apparatus of the present invention can be used to code much larger blocks. In such embodiments, the DCS table used to code a block will normally include one element for each coefficient of the block to be coded.

The Appendix attached hereto at the end of the detailed description and immediately preceding the claims, provides a detailed example of encoding operations performed in accordance with the present invention on an exemplary code-block having the values and structure shown in FIG. 2 will now be described with reference to the Appendix. In the first column of the Appendix, reference numbers have been added to correlate the particular step or operation listed to the right of the reference number to a step identified in one of the flow charts used to explain the invention. For example, reference number 1302 in the Appendix corresponds to the step in FIG. 13 identified by reference number 1302.

While the Appendix includes steps corresponding to the full set of coding passes performed on the exemplary coefficient block 200 of FIG. 2, the initialization and updating of a data coefficient state table 300, used to provide neighboring coefficient information during the coding processing in accordance with the invention, will be described with regard to the first few coding passes with reference to FIGS. 4 through 8B.

FIG. 4 illustrates the exemplary data state table of FIG. 3 initialized for use in an encoding operation. In the initialized table 300' each of the data state tables values, one per coefficient to be encoded, have been set to zero. The relationship between DCS entries in table 300' and the coefficient block 200 to be coded is as shown in FIG. 3. While each coefficient of the block 200 may include multiple values corresponding to different bit planes, a single DCS table value is maintained for each coefficient. The DCS value located at row 308, col. 302 corresponds to the first coefficient of block 200. Similarly, the DCS value located in row 312, col. 306 corresponds to the last coefficient in the coefficient block 200. This initialization which produces the initialized table 300' happens in START step 1302 of FIG. 13.

Figure 5:
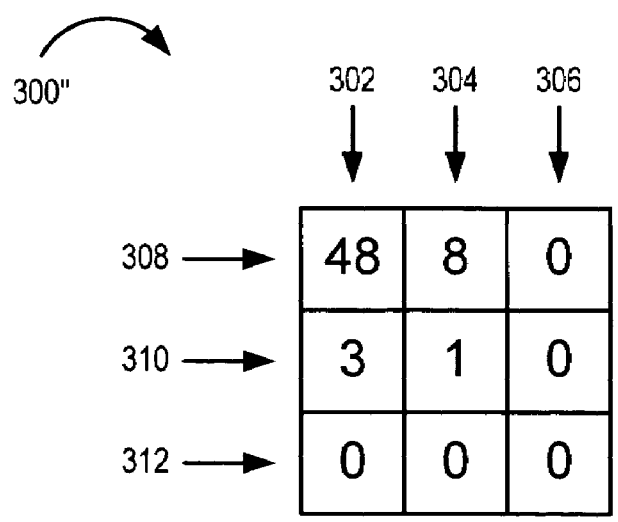
FIGS. 5 through 8B illustrate the values in the data state table after multiple updates performed in accordance with the present invention while processing the exemplary wavelet values shown in FIG. 2.

FIG. 5 illustrates the exemplary data state table of FIG. 3 after the first coding pass (clean-up pass on the first bit-plane indicated by 204, 216, 228) on the exemplary set of wavelet-coefficient values in FIG. 2. The resulting updated state table is identified in FIG. 5 as 300''. In this coding pass the coefficient value corresponding to a single wavelet coefficient located at row 238, col. 202, i.e., the coefficient corresponding to the DCS table value located at row 308/col. 302, has become significant with a positive value. The DCS table value corresponding to the horizontal neighbor at row 308/column 304 has had its value updated from 0 to 8, (see Appendix step A3) determined from the look-up table in FIG. 21, row 21000 (corresponding to the previous value 0), column 2104 (corresponding to a horizontal neighbor with a positive value). The vertical coefficient neighbor corresponding to row 310/col. 302 has had its DCS table value updated from 0 to 3, (see Appendix step A2) determined from the look-up table in FIG. 21, row 21000 (correspond-ing to the previous value 0), column 2108 (corresponding to a vertical neighbor with a positive value). The diagonal coefficient neighbor at row 310/column 304 has had its value updated from 0 to 1, (see Appendix step A2) determined from the look-up table in FIG. 21, row 21000 (corresponding to the previous value 0), column 2112 (corresponding to a diagonal neighbor). The coefficient itself which corresponds to row 308/column 302 has had its neighborhood-descriptor value updated from 0 to 48 (see Appendix step A5) (this value always being used when a coefficient becomes significant with a zero-value neighborhood descriptor). This coefficient has also either been added to the list of coefficients for the next magnitude-refinement pass, depending on the version of algorithm used, e.g., it is added to a list in embodiments which create a separate list of coefficients to be processed in a subsequent pass in accordance with the invention. Such a list normally will not include coefficients which will not be processed in a particular coding pass for which the list is created.

Figure 6:
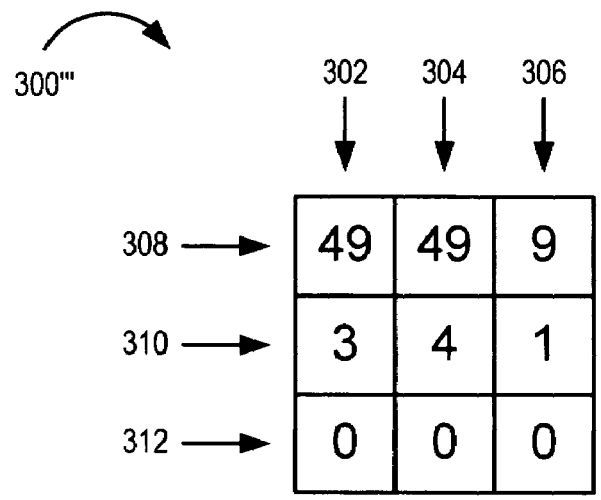

FIG. 6 indicates the exemplary data state table of FIG. 3, updated to state table 300''', after the second coding pass (significance-propagation pass on the second bit-plane indicated by 206, 218, 230) on the exemplary set of wavelet-coefficient values in FIG. 2. In this coding pass a single wavelet coefficient, that located at row 238/col. 206, which corresponds to DCT table location row 308, col. 304, has become significant with a negative value and is coded during the pass. The horizontal neighbor corresponding to row 308/col. 302 has had its value updated from 48 to 49 (see Appendix step A6), determined from the look-up table in FIG. 21, row 21048 (corresponding to the previous value 48) and column 2106 (corresponding to a horizontal neighbor with a negative value). The horizontal neighbor corresponding to row 308/col. 306 has had its value updated from 0 to 9, (see Appendix step A9) as determined from the look-up table in FIG. 21, row 21000 (corresponding to the previous value 0) and column 2106 (corresponding to a horizontal neighbor with a negative value). The vertical neighbor corresponding to row 310/col. 304 has its DCS table value updated from 1 to 4, (see Appendix step A8) as determined from the look-up table in FIG. 21, row 21001 (corresponding to the previous value 1), column 2110 (corresponding to a vertical neighbor with a negative value). The diagonal neighbor corresponding to row 310/column 302 has its value updated from 3 to 3, (see Appendix step A7) as determined from the look-up table in FIG. 21, row 21003 (corresponding to the previous value 3) and column 2112 (corresponding to a diagonal neighbor). The diagonal neighbor at row 310/column 306 has had its value updated from 0 to 1, (see Appendix step A10) as determined from the look-up table in FIG. 21, row 21000 (corresponding to the previous value 0), column 2112 (corresponding to a diagonal neighbor). The coefficient itself at row 308/column 304 has had its neighborhood-descriptor value updated from 8 to 49 (See Appendix step A10.5) (this value 49 is used in the exemplary embodiment whenever a coefficient which has a non-zero-value neighborhood descriptor becomes significant).

Figure 7:
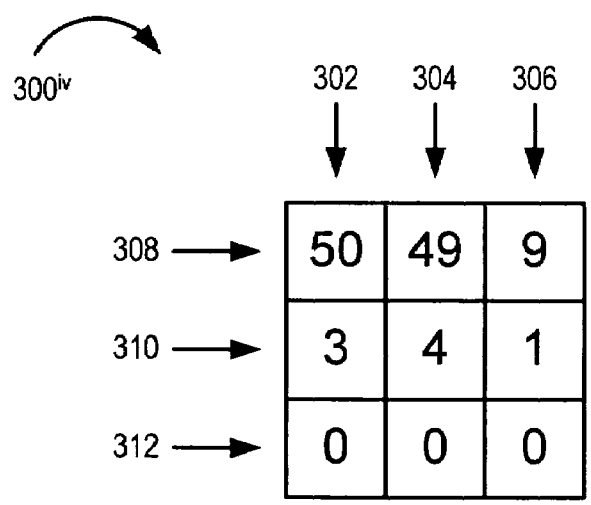

FIG. 7 indicates the exemplary data state table of FIG. 3, updated to state table 300$^{iv}$, after the third coding pass (magnitude-refinement pass on the second bit-plane indicated by 206, 218, 230) on the exemplary set of wavelet-coefficient values in FIG. 2. No coefficients ever become significant during a magnitude-refinement pass. The only change to the neighborhood-descriptor table from the previous step is that the coefficient at row 308/column 302, the sole coefficient listed in the table of coefficients to be processed in this pass, has had its neighborhood-descriptor (DCS table) value updated to 50, (see Appendix step A11) which is the value used in the exemplary embodiment for each coefficient that has been processed during the magnitude-refinement pass.

Figure 8A:
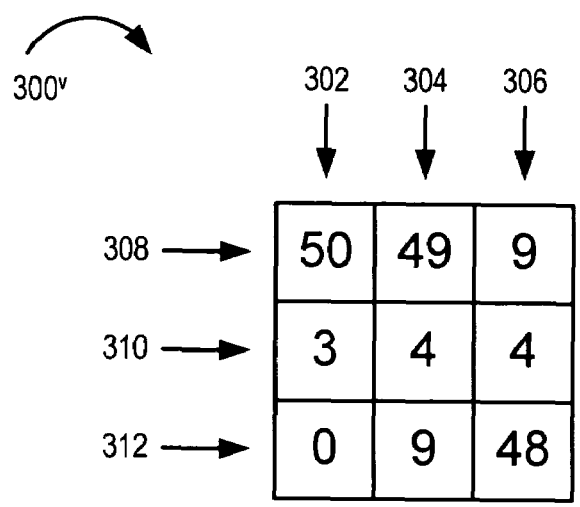

FIG. 8A indicates the exemplary data state table of FIG. 3 after the fourth coding pass (clean-up pass on the second bit-plane indicated by 206, 218, 230) on the exemplary set of wavelet-coefficient values in FIG. 2. The updated state table is identified as 300$^v$. In this coding pass a single wavelet coefficient, that located at row 242, 230 and corresponding to DCS table element (312, 306), has become significant with a negative value resulting in an update of DCS table element (312, 306) to 48 (See Appendix step A15). The horizontal neighbor corresponding to row 312/column 304 has had its value updated from 0 to 9 (See Appendix step A13), determined from the look-up table in FIG. 21, row 21000 (corresponding to the previous value 0), and column 2106 (corresponding to a horizontal neighbor with a negative value). The vertical neighbor at row 310/column 306 has had its value updated from 1 to 4 (see Appendix step A14), determined from the look-up table in FIG. 21, row 21001 (corresponding to the previous value 1), column 2110 (corresponding to a vertical neighbor with a negative value). The diagonal neighbor corresponding to row 310/column 304 has had its value updated from 4 to 4 (See Appendix step A12), determined from the look-up table in FIG. 21, row 21004 (corresponding to the previous value 4), column 2112 (corresponding to a diagonal neighbor). The coefficient itself has its corresponding DCS table value at row 312/column 306, i.e., its neighborhood-descriptor value, updated from 0 to 48 (see Appendix step 15) (this value is use in the example whenever a coefficient with a zero-value neighborhood descriptor becomes significant). The significant coefficients corresponding to row 308/column 302, row 308/column 304, and row 312/column 306 have also been added to the list of coefficients for the next magnitude-refinement pass, depending on the version of method used.

Figure 8B:
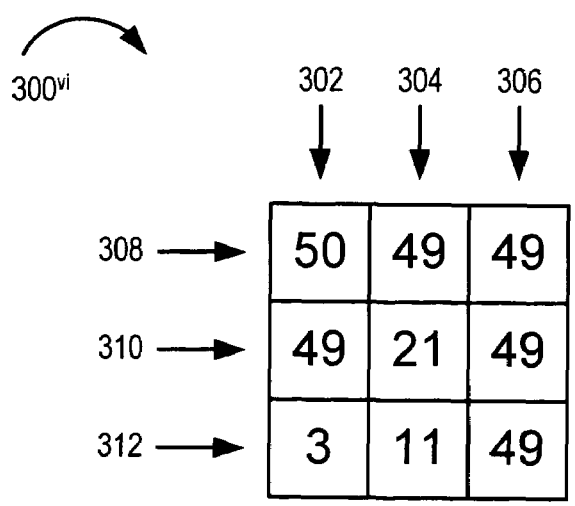

FIG. 8B indicates the exemplary data state table of FIG. 3 after the fifth coding pass (significance-propagation pass on the third bit-plane indicated by 208, 220, 232) on the exemplary set of wavelet-coefficient values in FIG. 2. The updated table is identified as 300$^{vi}$. In this coding pass three wavelet coefficients have become significant. In chronological order as given by JPEG 2000's scanning pattern these are: the coefficient corresponding to row 310/column 302 with a positive value; the coefficient corresponding to row 308/column 306 with a negative value; and the coefficient corresponding to row 810/column 806 with a positive value.

The coefficient corresponding to row 308/column 302, which is a vertical neighbor of the coefficient corresponding to row 310/column 302, has its neighborhood-descriptor in the table updated from 50 to 50, (see Appendix step A16) determined from the look-up table in FIG. 21, row 21050 (corresponding to the previous value 50) and column 2108 (corresponding to a vertical neighbor with a positive value).

The coefficient corresponding to row 312/column 302, a vertical neighbor of the coefficient corresponding to row 310/column 302, has its neighborhood-descriptor updated from 0 to 3, (see Appendix step A17) as determined from the look-up table in FIG. 21, row 21000 (corresponding to the previous value 50), and column 2108 (corresponding to a vertical neighbor with a positive value).

The coefficient corresponding to row 308/column 304, a diagonal neighbor of the coefficient corresponding to row 310/column 302, and a horizontal neighbor of the coefficient corresponding to row 308/column 306, and a diagonal neighbor of the coefficient corresponding to row 310/column 306, has its neighborhood-descriptor updated first from 49 to 49, (see Appendix step A18) determined from the look-up table in FIG. 21, row 21049 (corresponding to the previous value 49) and column 2112 (corresponding to a diagonal neighbor), then from 49 to 49, (see Appendix step A21) determined from the look-up table in FIG. 21, row 21049 (corresponding to the previous value 49), and column 2106 (corresponding to a horizontal neighbor with a negative value), and finally again from 49 to 49 (See Appendix step A24), determined from the look-up table in FIG. 21, row 21049 (corresponding to the previous value 49) and column 2112 (corresponding to a diagonal neighbor).

The coefficient corresponding to row 310/column 304, a horizontal neighbor of the coefficient corresponding to row 310/column 302, a diagonal neighbor of the coefficient corresponding to row 308/column 306, and a horizontal neighbor of the coefficient corresponding to row 310/column 306, has had its neighborhood-descriptor updated first from 4 to 12, (see Appendix step A19) determined from the look-up table in FIG. 21, row 21004 (corresponding to the previous value 4) and column 2104 (corresponding to a horizontal neighbor with a positive value), then from 12 to 12, (see Appendix step A22) determined from the look-up table in FIG. 21, row 21012 (corresponding to the previous value 12) and column 2112 (corresponding to a diagonal neighbor), and finally from 12 to 21, (see Appendix step A25) determined from the look-up table in FIG. 21, row 21012 (corresponding to the previous value 12) and column 2104 (corresponding to a horizontal neighbor with a positive value).

The coefficient corresponding to row 312/column 304, a diagonal neighbor of the coefficient corresponding to row 310/column 302 and a diagonal neighbor of the coefficient corresponding to row 310/column 306, has had its neighborhood-descriptor updated first from 9 to 11, (see Appendix step A20) determined from the look-up table in FIG. 21, row 21009 (corresponding to the previous value 9) and column 2112 (corresponding to a diagonal neighbor), and then from 11 to 11, (see Appendix step A26) determined from the look-up table in FIG. 21, row 21011 (corresponding to the previous value 11) and column 2112 (corresponding to a diagonal neighbor).

The coefficient corresponding to row 312/column 306, a vertical neighbor of the coefficient corresponding to row 310/column 306, has had its neighborhood-descriptor updated from 48 to 49, (see Appendix step A28) determined from the look-up table in FIG. 21, row 21048 (corresponding to the previous value 48), and column 2108 (corresponding to a vertical neighbor with a positive value).

The three coefficients corresponding to row 310/column 302, row 308/column 3066, and row 310/column 306 each have had their neighborhood descriptor values updated to the value 49 (see Step A20.5, A23.5, and A28.5) (this value 49 is used in the exemplary embodiment whenever a coefficient having a non-zero neighborhood descriptor value becomes significant).

The significant coefficients corresponding to row 308/column 302, row 810/column 302, row 308/column 304, row 308/column 306, row 310/column 306, and row 302/column 306 have also either been added to the list of coefficients for the next magnitude-refinement pass.

The processing of the exemplary block to be encoded will continue as set forth in the Appendix with the DCS table 300 being updated as processing in accordance with the invention continues until coding is complete.

Various features of the present invention are implemented using modules. Such modules may be implemented using software, hardware or a combination of software and hardware. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention.

Appendix

The following example traces the series of steps for coding the full set of bit-planes of the exemplary set of wavelet coefficients shown in FIG. 2. The state machine used in this example is State Machine D shown in FIG. 21.

Neighborhood descriptor values correspond to states D0-D50: value 0 indicates state D0, value 1 indicates state D1, etc.

Numbers at the start of a line in this Appendix are used to refer to correspondingly numbered steps of the flowcharts in FIGS. 9, 10, 11, and 13.

1302 CODING BEGINS *A1*

Code-block width is 3, height is 3.

Coefficient values:

+11001  −01011  −00100

+00111  −00010  +00110

+00010  −00011  −01011

1306 Select first bit-plane +10000
Current contents of neighborhood-descriptor table:

0 0 0
0 0 0  } FIG. 4
0 0 0

1312 Code clean-up pass.
1102 CLEAN-UP PASS BEGINS:
1104 Set initial wavelet coefficient to (0,0)
1152 Does current coefficient bit value start a sanctioned runlength of zeroes?
    No—go to step 1110.
1110 This bit value coded by MQ-coder on a previous pass?
    No—go to step 1112.
1112 Look up context state value (1114) from neighborhood descriptor value 0: 0
1116 MQ-encode bit-value 1 with context value 0
1118 Is the bit value of the wavelet coefficient a 1?
1120 Yes—go to step 1126.
1126 Look up default sign value (1128) from neighborhood descriptor value 0: +
1130 Look up sign context (1132) from neighborhood descriptor value 0: 9
    Sign matches default sign value (1128).
1134 MQ-encode 0 with context value 9
1136 Update neighbor states:
    (0,1): 0+vert->3 *A2*
    (1,0): 0+horz->8 *A3*
    (1,1): 0 diag->1 *A4*
    Update central state:
    (0,0): 0->48 *A5*
1144 Are wavelet coefficients exhausted?
1140 No—Move to next wavelet coefficient value (0,1)
1152 Does current coefficient bit value start a sanctioned runlength of zeroes?
    No—go to step 1110.
1110 This bit value coded by MQ-coder on a previous pass?
    No—go to step 1112.
1112 Look up context state value (1114) from neighborhood descriptor value 3: 3
1116 MQ-encode bit-value 0 with context value 3
1118 Is the bit value of the wavelet coefficient a 1?
    No—go to step 1144.
1144 Are wavelet coefficients exhausted?
1140 No—Move to next wavelet coefficient value (0,2)
1152 Does current coefficient bit value start a sanctioned runlength of zeroes?
    No—go to step 1110.
1110 This bit value coded by MQ-coder on a previous pass?
    No—go to step 1112.
1112 Look up context state value (1114) from neighborhood descriptor value 0: 0
1116 MQ-encode bit-value 0 with context value 0
1118 Is the bit value of the wavelet coefficient a 1?
    No—go to step 1144.
1144 Are wavelet coefficients exhausted?
1140 No—Move to next wavelet coefficient value (1,0)
1152 Does current coefficient bit value start a sanctioned runlength of zeroes?
    No—go to step 1110.
1110 This bit value coded by MQ-coder on a previous pass?
    No—go to step 1112.
1112 Look up context state value (1114) from neighborhood descriptor value 8: 5
1116 MQ-encode bit-value 0 with context value 5
1118 Is the bit value of the wavelet coefficient a 1?
    No—go to step 1144.
1144 Are wavelet coefficients exhausted?
1140 No—Move to next wavelet coefficient value (1,1)
1152 Does current coefficient bit value start a sanctioned runlength of zeroes?
    No—go to step 1110.
1110 This bit value coded by MQ-coder on a previous pass?
    No—go to step 1112.
1112 Look up context state value (1114) from neighborhood descriptor value 1: 1
1116 MQ-encode bit-value 0 with context value 1
1118 Is the bit value of the wavelet coefficient a 1?
    No—go to step 1144.
1144 Are wavelet coefficients exhausted?
1140 No—Move to next wavelet coefficient value (1,2)
1152 Does current coefficient bit value start a sanctioned runlength of zeroes?

No—go to step 1110.
1110 This bit value coded by MQ-coder on a previous pass?
No—go to step 1112.
1112 Look up context state value (1114) from neighborhood descriptor value 0: 0
1116 MQ-encode bit-value 0 with context value 0
1118 Is the bit value of the wavelet coefficient a 1?
No—go to step 1144.
1144 Are wavelet coefficients exhausted?
1140 No—Move to next wavelet coefficient value (2,0)
1152 Does current coefficient bit value start a sanctioned runlength of zeroes?
No—go to step 1110.
1110 This bit value coded by MQ-coder on a previous pass?
No—go to step 1112.
1112 Look up context state value (1114) from neighborhood descriptor value 0: 0
1116 MQ-encode bit-value 0 with context value 0
1118 Is the bit value of the wavelet coefficient a 1?
No—go to step 1144.
1144 Are wavelet coefficients exhausted?
1140 No—Move to next wavelet coefficient value (2,1)
1152 Does current coefficient bit value start a sanctioned runlength of zeroes?
No—go to step 1110.
1110 This bit value coded by MQ-coder on a previous pass?
No—go to step 1112.
1112 Look up context state value (1114) from neighborhood descriptor value 0: 0
1116 MQ-encode bit-value 0 with context value 0
1118 Is the bit value of the wavelet coefficient a 1?
No—go to step 1144.
1144 Are wavelet coefficients exhausted?
1140 No—Move to next wavelet coefficient value (2,2)
1152 Does current coefficient bit value start a sanctioned runlength of zeroes?
No—go to step 1110.
1110 This bit value coded by MQ-coder on a previous pass?
No—go to step 1112.
1112 Look up context state value (1114) from neighborhood descriptor value 0: 0
1116 MQ-encode bit-value 0 with context value 0
1118 Is the bit value of the wavelet coefficient a 1?
No—go to step 1144.
1144 Are wavelet coefficients exhausted?
1146 No—End clean-up pass.
1306 Yes—select next bit-plane +01000
Current contents of neighborhood-descriptor table:

$$\left. \begin{array}{ccc} 48 & 8 & 0 \\ 3 & 1 & 0 \\ 0 & 0 & 0 \end{array} \right\} \text{FIG. 5}$$

1308 Code significance-propagation pass.
902 SIGNIFICANCE-PROPAGATION PASS BEGINS
904 Set initial wavelet coefficient to (0,0)
910 Neighborhood descriptor value exceeds 47—skip
944 Are wavelet coefficients exhausted?
940 No—Move to next wavelet coefficient value (0,1)
912 Look up context state value (914) from neighborhood descriptor value 3: 3
916 MQ-encode bit-value 0 with context value 3
918 Is the bit value of the wavelet coefficient a 1?
No—go to step 944.
944 Are wavelet coefficients exhausted?
940 No—Move to next wavelet coefficient value (0,2)
912 Look up context state value (914) from neighborhood descriptor value 0: 0
910 Neighborhood descriptor value is 0—skip
944 Are wavelet coefficients exhausted?
940 No—Move to next wavelet coefficient value (1,0)
912 Look up context state value (914) from neighborhood descriptor value 8: 5
916 MQ-encode bit-value 1 with context value 5
918 Is the bit value of the wavelet coefficient a 1?
920 Yes—go to step 926.
926 Look up default sign value (928) from neighborhood descriptor value 8: +
930 Look up sign context (932) from neighborhood descriptor value 8: 12
Sign differs from default sign value (928).
934 MQ-encode 1 with context value 12
936 Update neighbor states:
(0,0): 48 –horz->49 *A6*
(0,1): 3 diag->3 *A7*
(1,1): 1 –vert->4 *A8*
(2,0): 0 –horz->9 *A9*
(2,1): 0 diag->1 *A10*
Update central state:
(1,0): 8 ->49 *A10.5*
944 Are wavelet coefficients exhausted?
940 No—Move to next wavelet coefficient value (1,1)
912 Look up context state value (914) from neighborhood descriptor value 4: 3
916 MQ-encode bit-value 0 with context value 3
918 Is the bit value of the wavelet coefficient a 1?
No—go to step 944.
944 Are wavelet coefficients exhausted?
940 No—Move to next wavelet coefficient value (1,2)
912 Look up context state value (914) from neighborhood descriptor value 0: 0
910 Neighborhood descriptor value is 0—skip
944 Are wavelet coefficients exhausted?
940 No—Move to next wavelet coefficient value (2,0)
912 Look up context state value (914) from neighborhood descriptor value 9: 5
916 MQ-encode bit-value 0 with context value 5
918 Is the bit value of the wavelet coefficient a 1?
No—go to step 944.
944 Are wavelet coefficients exhausted?
940 No—Move to next wavelet coefficient value (2,1)
912 Look up context state value (914) from neighborhood descriptor value 1: 1
916 MQ-encode bit-value 0 with context value 1
918 Is the bit value of the wavelet coefficient a 1?
No—go to step 944.
944 Are wavelet coefficients exhausted?
940 No—Move to next wavelet coefficient value (2,2)
912 Look up context state value (914) from neighborhood descriptor value 0: 0
910 Neighborhood descriptor value is 0—skip
944 Are wavelet coefficients exhausted?
946 Yes—End significance-propagation pass.
Current contents of neighborhood-descriptor table:

$$\left. \begin{array}{ccc} 49 & 49 & 9 \\ 3 & 4 & 1 \\ 0 & 0 & 0 \end{array} \right\} \text{FIG. 6}$$

1310 Code magnitude-refinement pass.
1002 MAGNITUDE-REFINEMENT PASS BEGINS
1004 Set initial wavelet coefficient to (0,0)
1008 Derive context state value (1010) from neighborhood descriptor value 49: 1012 MQ-encode bit-value 1 with context value 15
1014 Updating central state value to 50 *A11*
1018 Are wavelet coefficients exhausted?
1016 No—Move to next wavelet coefficient value (0,1)
1006 Neighborhood descriptor value does not exceed 47—skip
1018 Are wavelet coefficients exhausted?
1016 No—Move to next wavelet coefficient value (0,2)
1006 Neighborhood descriptor value does not exceed 47—skip
1018 Are wavelet coefficients exhausted?
1016 No—Move to next wavelet coefficient value (1,0)
1006 Neighborhood descriptor value does not exceed 47—skip
1018 Are wavelet coefficients exhausted?
1016 No—Move to next wavelet coefficient value (1,1)
1006 Neighborhood descriptor value does not exceed 47—skip
1018 Are wavelet coefficients exhausted?
1016 No—Move to next wavelet coefficient value (1,2)
1006 Neighborhood descriptor value does not exceed 47—skip
1018 Are wavelet coefficients exhausted?
1016 No—Move to next wavelet coefficient value (2,0)
1006 Neighborhood descriptor value does not exceed 47—skip
1018 Are wavelet coefficients exhausted?
1016 No—Move to next wavelet coefficient value (2,1)
1006 Neighborhood descriptor value does not exceed 47—skip
1018 Are wavelet coefficients exhausted?
1016 No—Move to next wavelet coefficient value (2,2)
1006 Neighborhood descriptor value does not exceed 47—skip
1018 Are wavelet coefficients exhausted?
1020—End magnitude-refinement pass.
Current contents of neighborhood-descriptor table:

$$\left.\begin{array}{ccc} 50 & 49 & 9 \\ 3 & 4 & 1 \\ 0 & 0 & 0 \end{array}\right\} \text{FIG. 7}$$

1312 Code clean-up pass.
1102 CLEAN-UP PASS BEGINS:
1104 Set initial wavelet coefficient to (0,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (0,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (0,2)
1152 Does current coefficient bit value start a sanctioned runlength of zeroes?
No—go to step 1110.
1110 This bit value coded by MQ-coder on a previous pass?
No—go to step 1112.
1112 Look up context state value (1114) from neighborhood descriptor value 0: 0
1116 MQ-encode bit-value 0 with context value 0
1118 Is the bit value of the wavelet coefficient a 1?
No—go to step 1144.
1144 Are wavelet coefficients exhausted?
1140 No—Move to next wavelet coefficient value (1,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (1,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (1,2)
1152 Does current coefficient bit value start a sanctioned runlength of zeroes?
No—go to step 1110.
1110 This bit value coded by MQ-coder on a previous pass?
No—go to step 1112.
1112 Look up context state value (1114) from neighborhood descriptor value 0: 0
1116 MQ-encode bit-value 0 with context value 0
1118 Is the bit value of the wavelet coefficient a 1?
No—go to step 1144.
1144 Are wavelet coefficients exhausted?
1140 No—Move to next wavelet coefficient value (2,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (2,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (2,2)
1152 Does current coefficient bit value start a sanctioned runlength of zeroes?
No—go to step 1110.
1110 This bit value coded by MQ-coder on a previous pass?
No—go to step 1112.
1112 Look up context state value (1114) from neighborhood descriptor value 0: 0
1116 MQ-encode bit-value 1 with context value 0
1118 Is the bit value of the wavelet coefficient a 1?
1120 Yes—go to step 1126.
1126 Look up default sign value (1128) from neighborhood descriptor value 0: +
1130 Look up sign context (1132) from neighborhood descriptor value 0: 9
Sign differs from default sign value (1128).
1134 MQ-encode 1 with context value 9
1136 Update neighbor states:
(1,1): 4 diag->4 *A12*
(1,2): O-horz->9 *A13*
(2,1): 1-vert->4 *A14*
Update central state:
(2,2): 0->48 *A15*

1144 Are wavelet coefficients exhausted?
1146 No—End clean-up pass.
1306 Yes—select next bit-plane +00100
Current contents of neighborhood-descriptor table:

$$\left.\begin{matrix} 50 & 49 & 9 \\ 3 & 4 & 4 \\ 0 & 9 & 48 \end{matrix}\right\} \text{FIG. 8A}$$

1308 Code significance-propagation pass.
902 SIGNIFICANCE-PROPAGATION PASS BEGINS
904 Set initial wavelet coefficient to (0,0)
910 Neighborhood descriptor value exceeds 47—skip
944 Are wavelet coefficients exhausted?
940 No—Move to next wavelet coefficient value (0,1)
912 Look up context state value (914) from neighborhood descriptor value 3: 3
916 MQ-encode bit-value 1 with context value 3
918 Is the bit value of the wavelet coefficient a 1?
920 Yes—go to step 926.
926 Look up default sign value (928) from neighborhood descriptor value 3: +
930 Look up sign context (932) from neighborhood descriptor value 3: 10
Sign matches default sign value (928).
934 MQ-encode 0 with context value 10
936 Update neighbor states:
 (0,0): 50+vert->50 *A16*
 (0,2): 0+vert->3 *A17*
 (1,0): 49 diag->49 *A18*
 (1,1): 4+horz->12 *A19*
 (1,2): 9 diag->11 *A20*
 Update central state:
 (0,1): 3->49 *A20.5*
944 Are wavelet coefficients exhausted?
940 No—Move to next wavelet coefficient value (0,2)
912 Look up context state value (914) from neighborhood descriptor value 3: 3
916 MQ-encode bit-value 0 with context value 3
918 Is the bit value of the wavelet coefficient a 1?
 No—go to step 944.
944 Are wavelet coefficients exhausted?
940 No—Move to next wavelet coefficient value (1,0)
910 Neighborhood descriptor value exceeds 47—skip
944 Are wavelet coefficients exhausted?
940 No—Move to next wavelet coefficient value (1,1)
912 Look up context state value (914) from neighborhood descriptor value 12: 7
916 MQ-encode bit-value 0 with context value 7
918 Is the bit value of the wavelet coefficient a 1?
 No—go to step 944.
944 Are wavelet coefficients exhausted?
940 No—Move to next wavelet coefficient value (1,2)
912 Look up context state value (914) from neighborhood descriptor value 11: 6
916 MQ-encode bit-value 0 with context value 6
918 Is the bit value of the wavelet coefficient a 1?
 No—go to step 944.
944 Are wavelet coefficients exhausted?
940 No—Move to next wavelet coefficient value (2,0)
912 Look up context state value (914) from neighborhood descriptor value 9: 5
916 MQ-encode bit-value 1 with context value 5
918 Is the bit value of the wavelet coefficient a 1?
920 Yes—go to step 926.
926 Look up default sign value (928) from neighborhood descriptor value 9: -
930 Look up sign context (932) from neighborhood descriptor value 9: 12
Sign matches default sign value (928).
934 MQ-encode 0 with context value 12
936 Update neighbor states:
 (1,0): 49 -horz->49 *A21*
 (1,1): 12 diag->12 *A22*
 (2,1): 4 -vert->7 *A23*
 Update central state:
 (2,0): 9->49 *A23.5*
944 Are wavelet coefficients exhausted?
940 No—Move to next wavelet coefficient value (2,1)
912 Look up context state value (914) from neighborhood descriptor value 7: 4
916 MQ-encode bit-value 1 with context value 4
918 Is the bit value of the wavelet coefficient a 1?
920 Yes—go to step 926.
926 Look up default sign value (928) from neighborhood descriptor value 7: -
930 Look up sign context (932) from neighborhood descriptor value 7: 10
Sign differs from default sign value (928).
934 MQ-encode 1 with context value 10
936 Update neighbor states:
 (1,0): 49 diag->49 *A24*
 (1,1): 12+horz->21 *A25*
 (1,2): 11 diag->11 *A26*
 (2,0): 49+vert->49 *A27*
 (2,2): 48+vert->49 *A28*
 Update central state:
 (2,1): 7->49 *A28.5*
944 Are wavelet coefficients exhausted?
940 No—Move to next wavelet coefficient value (2,2)
910 Neighborhood descriptor value exceeds 47—skip
944 Are wavelet coefficients exhausted?
946 Yes—End significance-propagation pass.
Current contents of neighborhood-descriptor table:

$$\left.\begin{matrix} 50 & 49 & 49 \\ 49 & 21 & 49 \\ 3 & 11 & 49 \end{matrix}\right\} \text{FIG. 8B}$$

1310 Code magnitude-refinement pass.
1002 MAGNITUDE-REFINEMENT PASS BEGINS
1004 Set initial wavelet coefficient to (0,0)
1008 Derive context state value (1010) from neighborhood descriptor value 50: 1012 MQ-encode bit-value 0 with context value 16
1014 Updating central state value to 50
1018 Are wavelet coefficients exhausted?
1016 No—Move to next wavelet coefficient value (0,1)
1006 Neighborhood descriptor value does not exceed 47—skip
1018 Are wavelet coefficients exhausted?
1016 No—Move to next wavelet coefficient value (0,2)
1006 Neighborhood descriptor value does not exceed 47—skip
1018 Are wavelet coefficients exhausted?
1016 No—Move to next wavelet coefficient value (1,0)
1008 Derive context state value (1010) from neighborhood descriptor value 49: 1012 MQ-encode bit-value 0 with context value 15

1014 Updating central state value to 50
1018 Are wavelet coefficients exhausted?
1016 No—Move to next wavelet coefficient value (1,1)
1006 Neighborhood descriptor value does not exceed 47—skip
1018 Are wavelet coefficients exhausted?
1016 No—Move to next wavelet coefficient value (1,2)
1006 Neighborhood descriptor value does not exceed 47—skip
1018 Are wavelet coefficients exhausted?
1016 No—Move to next wavelet coefficient value (2,0)
1006 Neighborhood descriptor value does not exceed 47—skip
1018 Are wavelet coefficients exhausted?
1016 No—Move to next wavelet coefficient value (2,1)
1006 Neighborhood descriptor value does not exceed 47—skip
1018 Are wavelet coefficients exhausted?
1016 No—Move to next wavelet coefficient value (2,2)
1008 Derive context state value (1010) from neighborhood descriptor value 49: 1012 MQ-encode bit-value 0 with context value 15
1014 Updating central state value to 50
1018 Are wavelet coefficients exhausted?
1020—End magnitude-refinement pass.
Current contents of neighborhood-descriptor table:

| | | |
|---|---|---|
| 50 | 50 | 50 |
| 50 | 50 | 50 |
| 50 | 50 | 50 |

1312 Code clean-up pass.
1102 CLEAN-UP PASS BEGINS:
1104 Set initial wavelet coefficient to (0,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (0,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (0,2)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (1,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (1,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (1,2)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (2,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (2,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (2,2)
1152 Does current coefficient bit value start a sanctioned runlength of zeroes?
No—go to step 1110.
1110 This bit value coded by MQ-coder on a previous pass?
1108 Yes—go to step 1144.
1146 No—End clean-up pass.
1306 Yes—select next bit-plane +00010
Current contents of neighborhood-descriptor table:

| | | |
|---|---|---|
| 50 | 50 | 49 |
| 49 | 21 | 49 |
| 3 | 11 | 50 |

1308 Code significance-propagation pass.
902 SIGNIFICANCE-PROPAGATION PASS BEGINS
904 Set initial wavelet coefficient to (0,0)
910 Neighborhood descriptor value exceeds 47—skip
944 Are wavelet coefficients exhausted?
940 No—Move to next wavelet coefficient value (0,1)
910 Neighborhood descriptor value exceeds 47—skip
944 Are wavelet coefficients exhausted?
940 No—Move to next wavelet coefficient value (0,2)
912 Look up context state value (914) from neighborhood descriptor value 3: 3
916 MQ-encode bit-value 1 with context value 3
918 Is the bit value of the wavelet coefficient a 1?
920 Yes—go to step 926.
926 Look up default sign value (928) from neighborhood descriptor value 3: +
930 Look up sign context (932) from neighborhood descriptor value 3: 10
Sign matches default sign value (928).
934 MQ-encode 0 with context value 10
936 Update neighbor states:
(0,1): 49+vert->49
(1,1): 21 diag->21
(1,2): 11+horz->18
Update central state:
(0,2): 3 ->49
944 Are wavelet coefficients exhausted?
940 No—Move to next wavelet coefficient value (1,0)
910 Neighborhood descriptor value exceeds 47—skip
944 Are wavelet coefficients exhausted?
940 No—Move to next wavelet coefficient value (1,1)
912 Look up context state value (914) from neighborhood descriptor value 21: 8
916 MQ-encode bit-value 1 with context value 8
918 Is the bit value of the wavelet coefficient a 1?

920 Yes—go to step 926.
926 Look up default sign value (928) from neighborhood descriptor value 21: +
930 Look up sign context (932) from neighborhood descriptor value 21: 11
Sign differs from default sign value (928).
934 MQ-encode 1 with context value 11
936 Update neighbor states:
(0,0): 50 diag->50
(0,1): 49 –horz->49
(0,2): 49 diag->49
(1,0): 50 –vert->50
(1,2): 18 –vert->20
(2,0): 49 diag->49
(2,1): 49 –horz->49
(2,2): 50 diag->50
Update central state:
(1,1): 21->49
944 Are wavelet coefficients exhausted?
940 No—Move to next wavelet coefficient value (1,2)
912 Look up context state value (914) from neighborhood descriptor value 20: 8
916 MQ-encode bit-value 1 with context value 8
918 Is the bit value of the wavelet coefficient a 1?
920 Yes—go to step 926.
926 Look up default sign value (928) from neighborhood descriptor value 20: –
930 Look up sign context (932) from neighborhood descriptor value 20: 10
Sign matches default sign value (928).
934 MQ-encode 0 with context value 10
936 Update neighbor states:
(0,1): 49 diag->49
(0,2): 49 –horz->49
(1,1): 49 –vert->49
(2,1): 49 diag->49
(2,2): 50 –horz->50
Update central state:
(1,2): 20->49
944 Are wavelet coefficients exhausted?
940 No—Move to next wavelet coefficient value (2,0)
910 Neighborhood descriptor value exceeds 47—skip
944 Are wavelet coefficients exhausted?
940 No—Move to next wavelet coefficient value (2,1)
910 Neighborhood descriptor value exceeds 47—skip
944 Are wavelet coefficients exhausted?
940 No—Move to next wavelet coefficient value (2,2)
910 Neighborhood descriptor value exceeds 47—skip
944 Are wavelet coefficients exhausted?
946 Yes—End significance-propagation pass.
Current contents of neighborhood-descriptor table:

50 50 49

49 49 49

49 49 50

1310 Code magnitude-refinement pass.
1002 MAGNITUDE-REFINEMENT PASS BEGINS
1004 Set initial wavelet coefficient to (0,0)
1008 Derive context state value (1010) from neighborhood descriptor value 50: 1012 MQ-encode bit-value 0 with context value 16
1014 Updating central state value to 50
1018 Are wavelet coefficients exhausted?
1016 No—Move to next wavelet coefficient value (0,1)
1008 Derive context state value (1010) from neighborhood descriptor value 49: 1012 MQ-encode bit-value 1 with context value 15
1014 Updating central state value to 50
1018 Are wavelet coefficients exhausted?
1016 No—Move to next wavelet coefficient value (0,2)
1006 Neighborhood descriptor value does not exceed 47—skip
1018 Are wavelet coefficients exhausted?
1016 No—Move to next wavelet coefficient value (1,0)
1008 Derive context state value (1010) from neighborhood descriptor value 50: 1012 MQ-encode bit-value 1 with context value 16
1014 Updating central state value to 50
1018 Are wavelet coefficients exhausted?
1016 No—Move to next wavelet coefficient value (1,1)
1006 Neighborhood descriptor value does not exceed 47—skip
1018 Are wavelet coefficients exhausted?
1016 No—Move to next wavelet coefficient value (1,2)
1006 Neighborhood descriptor value does not exceed 47—skip
1018 Are wavelet coefficients exhausted?
1016 No—Move to next wavelet coefficient value (2,0)
1008 Derive context state value (1010) from neighborhood descriptor value 49: 1012 MQ-encode bit-value 0 with context value 15
1014 Updating central state value to 50
1018 Are wavelet coefficients exhausted?
1016 No—Move to next wavelet coefficient value (2,1)
1008 Derive context state value (1010) from neighborhood descriptor value 49: 1012 MQ-encode bit-value 1 with context value 15
1014 Updating central state value to 50
1018 Are wavelet coefficients exhausted?
1016 No—Move to next wavelet coefficient value (2,2)
1008 Derive context state value (1010) from neighborhood descriptor value 50: 1012 MQ-encode bit-value 1 with context value 16
1014 Updating central state value to 50
1018 Are wavelet coefficients exhausted?
1020—End magnitude-refinement pass.
Current contents of neighborhood-descriptor table:

50 50 49

49 49 49

49 49 50

1312 Code clean-up pass.
1102 CLEAN-UP PASS BEGINS:
1104 Set initial wavelet coefficient to (0,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (0,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (0,2)
1152 Does current coefficient bit value start a sanctioned runlength of zeroes?
No—go to step 1110.

1110 This bit value coded by MQ-coder on a previous pass?
1108 Yes—go to step 1144.
1140 No—Move to next wavelet coefficient value (1,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (1,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (1,2)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (2,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (2,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (2,2)
1152 Does current coefficient bit value start a sanctioned runlength of zeroes?
No—go to step 1110.
1110 This bit value coded by MQ-coder on a previous pass?
1108 Yes—go to step 1144.
1146 No—End clean-up pass.
1306 Yes—select next bit-plane +00001
Current contents of neighborhood-descriptor table:

| 50 | 50 | 50 |
|----|----|----|
| 50 | 49 | 50 |
| 49 | 49 | 50 |

1308 Code significance-propagation pass.
902 SIGNIFICANCE-PROPAGATION PASS BEGINS
904 Set initial wavelet coefficient to (0,0)
910 Neighborhood descriptor value exceeds 47—skip
944 Are wavelet coefficients exhausted?
940 No—Move to next wavelet coefficient value (0,1)
910 Neighborhood descriptor value exceeds 47—skip
944 Are wavelet coefficients exhausted?
940 No—Move to next wavelet coefficient value (0,2)
910 Neighborhood descriptor value exceeds 47—skip
944 Are wavelet coefficients exhausted?
940 No—Move to next wavelet coefficient value (1,0)
910 Neighborhood descriptor value exceeds 47—skip
944 Are wavelet coefficients exhausted?
940 No—Move to next wavelet coefficient value (1,1)
910 Neighborhood descriptor value exceeds 47—skip
944 Are wavelet coefficients exhausted?
940 No—Move to next wavelet coefficient value (1,2)
910 Neighborhood descriptor value exceeds 47—skip
944 Are wavelet coefficients exhausted?
940 No—Move to next wavelet coefficient value (2,0)
910 Neighborhood descriptor value exceeds 47—skip
944 Are wavelet coefficients exhausted?
940 No—Move to next wavelet coefficient value (2,1)
910 Neighborhood descriptor value exceeds 47—skip
944 Are wavelet coefficients exhausted?
940 No—Move to next wavelet coefficient value (2,2)
910 Neighborhood descriptor value exceeds 47—skip
944 Are wavelet coefficients exhausted?
946 Yes—End significance-propagation pass.
Current contents of neighborhood-descriptor table:

| 50 | 50 | 50 |
|----|----|----|
| 50 | 49 | 50 |
| 49 | 49 | 50 |

1310 Code magnitude-refinement pass.
1002 MAGNITUDE-REFINEMENT PASS BEGINS
1004 Set initial wavelet coefficient to (0,0)
1008 Derive context state value (1010) from neighborhood descriptor value 50: 1012 MQ-encode bit-value 1 with context value 16
1014 Updating central state value to 50
1018 Are wavelet coefficients exhausted?
1016 No—Move to next wavelet coefficient value (0,1)
1008 Derive context state value (1010) from neighborhood descriptor value 50: 1012 MQ-encode bit-value 1 with context value 16
1014 Updating central state value to 50
1018 Are wavelet coefficients exhausted?
1016 No—Move to next wavelet coefficient value (0,2)
1008 Derive context state value (1010) from neighborhood descriptor value 49: 1012 MQ-encode bit-value 0 with context value 15
1014 Updating central state value to 50
1018 Are wavelet coefficients exhausted?
1016 No—Move to next wavelet coefficient value (1,0)
1008 Derive context state value (1010) from neighborhood descriptor value 50: 1012 MQ-encode bit-value 1 with context value 16
1014 Updating central state value to 50
1018 Are wavelet coefficients exhausted?
1016 No—Move to next wavelet coefficient value (1,1)
1008 Derive context state value (1010) from neighborhood descriptor value 49: 1012 MQ-encode bit-value 0 with context value 15
1014 Updating central state value to 50
1018 Are wavelet coefficients exhausted?
1016 No—Move to next wavelet coefficient value (1,2)
1008 Derive context state value (1010) from neighborhood descriptor value 49: 1012 MQ-encode bit-value 1 with context value 15
1014 Updating central state value to 50
1018 Are wavelet coefficients exhausted?
1016 No—Move to next wavelet coefficient value (2,0)
1008 Derive context state value (1010) from neighborhood descriptor value 50: 1012 MQ-encode bit-value 0 with context value 16
1014 Updating central state value to 50
1018 Are wavelet coefficients exhausted?
1016 No—Move to next wavelet coefficient value (2,1)
1008 Derive context state value (1010) from neighborhood descriptor value 50: 1012 MQ-encode bit-value 0 with context value 16
1014 Updating central state value to 50
1018 Are wavelet coefficients exhausted?

1016 No—Move to next wavelet coefficient value (2,2)
1008 Derive context state value (1010) from neighborhood descriptor value 50: 1012 MQ-encode bit-value 1 with context value 16
1014 Updating central state value to 50
1018 Are wavelet coefficients exhausted?
1020—End magnitude-refinement pass.
Current contents of neighborhood-descriptor table:

50 50 50

50 50 50

50 50 50

1312 Code clean-up pass.
1102 CLEAN-UP PASS BEGINS:
1104 Set initial wavelet coefficient to (0,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (0,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (0,2)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (1,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (1,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (1,2)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (2,0)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (2,1)
1152 Does current coefficient bit value start a sanctioned runlength of zeroes?
No—go to step 1110.
1110 This bit value coded by MQ-coder on a previous pass?
1108 Yes—go to step 1144.
1140 No—Move to next wavelet coefficient value (2,2)
1152 Does current coefficient bit value start a sanctioned runlength of zeroes?
No—go to step 1110.
1110 This bit value coded by MQ-coder on a previous pass?
1108 Yes—go to step 1144.
1146 No—End clean-up pass.

What is claimed:

1. A method of performing an MQ encoding operation on at least one coefficient in a block of coefficients representing at least a portion of an image, said at least one coefficient being a quantized coefficient value including at least one coefficient bit value and a sign bit, the method comprising:

storing a neighborhood descriptor value in a memory for said at least one coefficient value, said neighborhood descriptor value being stored in a set of neighborhood descriptor values, each coefficient value in said block having a separate corresponding neighborhood descriptor value in said set of neighborhood descriptor values;

performing a look up operation using the neighborhood descriptor value corresponding to said at least one coefficient as an index into a neighborhood descriptor value information table to determine from said neighborhood descriptor information table, an MQ coder context state associated with the neighborhood descriptor value corresponding to said at least one coefficient, said MQ coder context state being a context state used as a control input when coding at least one of: said at least one coefficient bit value of said at least one coefficient and said sign bit of said at least one coefficient; and using said determined context state to perform an MQ coding operation on at least one of said at least one coefficient bit value and said sign bit of said at least one coefficient.

2. The method of claim 1,
wherein said block of coefficient values is a two dimensional matrix; and
wherein said at least one bit value is a first non-zero bit value in said coefficient to be coded, the method further comprising:
updating a first adjacent neighborhood descriptor value in said set of neighborhood descriptor values, said first adjacent neighborhood descriptor value being a neighborhood descriptor value corresponding to a coefficient located in said matrix adjacent to said at least one coefficient.

3. The method of claim 2, wherein updating the first adjacent neighborhood descriptor value includes:
performing a first new state descriptor value look-up operation as a function of: i) a current value of said first adjacent neighborhood descriptor value at the time of said update and ii) first position information indicating the position of the coefficient corresponding to said first adjacent neighborhood descriptor value relative to the position in said two dimensional matrix of said at least one coefficient.

4. The method of claim 3, wherein the coefficient corresponding to said first adjacent neighborhood descriptor value is a diagonal neighbor of said at least one coefficient, said look-up operation including accessing a state descriptor information table using the current value of said first adjacent neighborhood descriptor value and said first position information as indices into the state information table to retrieve a new state descriptor value corresponding to the table entry identified by the indices used to access the state descriptor information table.

5. The method of claim 3, wherein the coefficient corresponding to said first adjacent neighborhood descriptor value is a vertical or horizontal neighbor of said at least one coefficient, said look-up operation including accessing a state descriptor information table using the current value of said first adjacent neighborhood descriptor value, said first position information, and information indicating a sign associated with the bit of said at least one coefficient which was coded to identify a new state descriptor value to be used for said first adjacent neighborhood descriptor value.

6. The method of claim 5, further comprising:
updating the state descriptor value, in said set of state descriptor values, that corresponds to each additional coefficient that is an immediately adjacent neighbor to said at least one coefficient, in said block of coefficients.

7. The method of claim 6, wherein updating the state descriptor value that corresponds to each additional coefficient that is an immediately adjacent neighbor includes accessing said state descriptor information table as a function of the current state descriptor value of each additional coefficient to determine a new state descriptor value from said state descriptor information table for each additional coefficient.

8. The method of claim 1, further comprising:
updating the state descriptor value of said at least one coefficient to a predetermined state descriptor value when said coefficient has already had at least one bit value coded during a magnitude refinement pass.

9. The method of claim 1,
wherein said determined MQ coder context state includes significance context state; and wherein using said determined context state to perform a coding operation includes performing a coding operation on said at least one bit value of said at least one coefficient.

10. The method of claim 1, wherein said determined context state includes sign context state; and
wherein said coding operation is performed on said sign bit.

11. The method of claim 10, further comprising:
determining a default sign value to be used in said step of coding the sign bit.

12. The method of claim 1, wherein said MQ encoding procedure is compliant with JPEG 2000 MQ encoding requirements.

13. The method of claim 1,
wherein said block of coefficients includes coefficients of a single wavelet type; and
wherein said neighborhood descriptor value information table is table including neighborhood descriptor values corresponding to said single wavelet type.

14. The method of claim 1, further comprising:
storing in memory a different neighborhood descriptor information table for each of at least two of the following: LL wavelet coefficients, HH wavelet coefficients, LH wavelet coefficients and HL wavelet coefficients; and
wherein said step of performing a look up operation using the neighborhood descriptor value includes selecting the stored neighborhood descriptor information table corresponding to the type of wavelet coefficients in said block of coefficients to be used as the neighborhood descriptor value information table from which coding context information is retrieved for coefficients in said block of coefficients.

15. The method of claim 14, wherein each of said stored neighborhood descriptor information tables includes less than 256 different neighborhood descriptor values.

16. The method of claim 14, wherein each of said neighborhood descriptor information tables includes less than 52 different neighborhood descriptor values.

17. The method of claim 1, wherein said neighborhood descriptor information table includes less than 52 different neighborhood descriptor values, a different neighborhood descriptor value being used for each possible unique set of coding context values associated in said neighborhood descriptor information table with a neighborhood descriptor.

18. The method of claim 17, wherein said neighborhood descriptor information table includes new neighborhood descriptor values to which a current neighborhood descriptor value transitions when a neighboring coefficient becomes significant during a coding pass.

19. A system for performing JPEG-2000 MQ encoding operations on at least one coefficient in a block of coefficients representing at least a portion of an image, said at least one coefficient being a quantized coefficient value including at least one coefficient bit value and a sign bit, the system comprising:
a memory including a set of neighborhood descriptor values, said set including one neighborhood descriptor value for each coefficient in said block of coefficients;
a neighborhood descriptor value information lookup table including an entry associating at least one encoding context value with a neighborhood descriptor value;
means for performing a look up operation using the neighborhood descriptor value corresponding to said at least one coefficient as an index into said neighborhood descriptor value information lookup table to determine from said neighborhood descriptor information lookup table, an MQ coder context state associated with the neighborhood descriptor value corresponding to said at least one coefficient, said MQ coder context state being a context state used as a control input when coding at least one of: said at least one coefficient bit value of said at least one coefficient and said sign bit of said at least one coefficient; and
means for supplying the determined context value to an MQ coder for performing an MQ coding operation on at least one of said at least one coefficient bit value and said sign bit of said at least one coefficient.

20. The system of claim 19,
wherein said block of coefficient values is a two dimensional matrix; and
wherein said at least one bit value is a first non-zero bit value in said coefficient to be coded, the system further comprising:
means for updating a first adjacent neighborhood descriptor value in said set of neighborhood descriptor values, said first adjacent neighborhood descriptor value being a neighborhood descriptor value corresponding to a coefficient located in said matrix adjacent to said at least one coefficient.

21. The system of claim 20, further comprising:
means for updating the state descriptor value, in said set of state descriptor values, that corresponds to each additional coefficient that is an immediately adjacent neighbor to said at least one coefficient, in said block of coefficients by performing a look-up operation using said neighborhood descriptor value information lookup table.

* * * * *